US011709963B2

(12) United States Patent
Katsura et al.

(10) Patent No.: US 11,709,963 B2
(45) Date of Patent: Jul. 25, 2023

(54) MEMORY SYSTEM, COMPUTER SYSTEM, AND INFORMATION PROTECTION METHOD

(71) Applicant: MegaChips Corporation, Osaka (JP)

(72) Inventors: Toshio Katsura, Osaka (JP); Masahiro Shindo, Osaka (JP); Injie Nakao, Osaka (JP); Motoaki Yasui, Osaka (JP); Masashi Kuramoto, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 516 days.

(21) Appl. No.: 16/831,839

(22) Filed: Mar. 27, 2020

(65) Prior Publication Data

US 2020/0311301 A1 Oct. 1, 2020

(30) Foreign Application Priority Data

Mar. 29, 2019 (JP) ................................ 2019-066502
Apr. 17, 2019 (JP) ................................ 2019-078934

(51) Int. Cl.
*G06F 21/78* (2013.01)
*A63F 13/60* (2014.01)
(Continued)

(52) U.S. Cl.
CPC .......... *G06F 21/6245* (2013.01); *A63F 13/60* (2014.09); *A63F 13/69* (2014.09);
(Continued)

(58) Field of Classification Search
CPC .. A63F 2300/6009; A63F 13/60; A63F 13/69; G06F 21/78; G06F 16/156; G06F 16/148; G06F 16/168; G06F 21/6245
See application file for complete search history.

(56) References Cited

U.S. PATENT DOCUMENTS

2017/0340972 A1* 11/2017 Seo ......................... A63F 13/87
2018/0147489 A1 5/2018 Shirakami et al.
(Continued)

FOREIGN PATENT DOCUMENTS

JP 2018-086085 A 6/2018

OTHER PUBLICATIONS

Office Action dated Mar. 30, 2022, in corresponding Japanese Patent Application No. 2019-078934.

*Primary Examiner* — David L Lewis
*Assistant Examiner* — Shauna-Kay Hall
(74) *Attorney, Agent, or Firm* — Xsensus LLP

(57) ABSTRACT

A memory system connected to a host computer generating input information, includes a storage configured to store application program executed by the host computer, a contents database relating various contents candidate information used by the host computer with either of plural adjustment candidate identification information, and input information inputted from the host computer, circuitry configured to infer, by executing inference by an artificial intelligence algorithm, specific adjustment candidate identification information as adjustment identification information from the plurality of adjustment candidate identification information according to the input information and select specific contents candidate information as adjustment contents information from the contents database using the adjustment identification information and an interface configured to output the adjustment contents information to the host computer.

9 Claims, 17 Drawing Sheets

(51) Int. Cl.
*G06F 21/62* (2013.01)
*G06F 16/16* (2019.01)
*G06F 16/14* (2019.01)
*A63F 13/69* (2014.01)

(52) U.S. Cl.
CPC .......... *G06F 16/148* (2019.01); *G06F 16/156* (2019.01); *G06F 16/168* (2019.01); *G06F 21/78* (2013.01); *A63F 2300/6009* (2013.01)

(56) References Cited

U.S. PATENT DOCUMENTS

| | | | | |
|---|---|---|---|---|
| 2018/0207522 | A1* | 7/2018 | Roman | G06F 3/04842 |
| 2019/0102684 | A1* | 4/2019 | Beran | G06F 11/3438 |
| 2020/0241769 | A1* | 7/2020 | Dain | G06F 16/907 |

* cited by examiner

| | FIRST ITEM | SECOND ITEM | |
|---|---|---|---|
| 317 | ADJUSTMENT CANDIDATE IDENTIFICATION INFORMATION | CONTENTS CANDIDATE INFORMATION | 318 |
| 317 | ADJUSTMENT CANDIDATE IDENTIFICATION INFORMATION | CONTENTS CANDIDATE INFORMATION | 318 |
| 317 | ADJUSTMENT CANDIDATE IDENTIFICATION INFORMATION | CONTENTS CANDIDATE INFORMATION | 318 |
| | ⋮ | ⋮ | |
| 317 | ADJUSTMENT CANDIDATE IDENTIFICATION INFORMATION | CONTENTS CANDIDATE INFORMATION | 318 |
| 317 | ADJUSTMENT CANDIDATE IDENTIFICATION INFORMATION | CONTENTS CANDIDATE INFORMATION | 318 |

| PHENOMENON INFORMATION | NOTICE CANDIDATE INFORMATION |
|---|---|
| AGE | VALUE |
| SEX | MALE |
| | FEMALE |
| ⋮ | ⋮ |
| BUSY CONDITION | STILLNESS |
| | WALKING |
| | ON VEHICLE |
| LEVEL | LOW |
| | MIDDLE |
| | HIGH |
| STATE OF MIND | USUALLY |
| | RELAXED |
| | EXCITEMENT |
| | CRYING |
| | ANGER |

| PHENOMENON INFORMATION | AGE | SEX | ... | BUSY CONDITION | LEVEL | STATE OF MIND |
|---|---|---|---|---|---|---|
| PARTIAL SITUATION | 19 | MALE | ... | STILLNESS | HIGH | RELAXED |

MEMORY SYSTEM, COMPUTER SYSTEM, AND INFORMATION PROTECTION METHOD

CROSS REFERENCE TO RELATED APPLICATIONS

The present application claims priority from Japanese Application Number 2019-066502 filed in Japan on Mar. 29, 2019, and Japanese Application Number 2019-078934 filed in Japan on Apr. 17, 2019, the contents of each are incorporated herein by reference.

BACKGROUND

Technical Field

The present disclosure relates to techniques to protect information in the computer equipped with functions of artificial intelligence.

Description of the Background Art

Conventionally, the computer system which connected the host computer and the memory system is known. For example, as such the computer system, the system which equipped the tablet (host computer) with the memory card may be considered.

In such the computer system, an application program and contents information are beforehand stored in the memory card, and during connecting the memory card, the application program is loaded to the host computer. The host computer, while executing the loaded application program, realizes various applications by reading and using contents information from the memory card with which the host computer was equipped.

On the other hand, recently, in the application executed by computer, artificial intelligence technology is offered. The technology of changing application according to the phenomenon determined by inference processing by an artificial intelligence is proposed. As such techniques, in the Patent Document (Japanese Unexamined Patent Application Publication No. 2018-086085), for example, the technology of determining action of a game character according to the inferred phenomenon based on the operation input of a player is disclosed.

However, in order to make the inference process by an artificial intelligence algorithm perform to the host computer, in the computer system which connected the host computer and the memory system, once the memory system transmits all the contents information (may be chosen by inferring) to the host computer, there is a problem of becoming easy to extract the contents information unjustly.

SUMMARY

It is an object of the present invention to provide techniques which can protect information in a computer system equipped with functions of artificial intelligence.

Therefore, the present invention is directed to a memory system connected to a host computer generating input information.

According to an aspect of the present invention, the memory system includes: a storage configured to store application program executed by the host computer, a contents database relating various contents candidate information used by the host computer with either of plural adjustment candidate identification information, and input information inputted from the host computer; circuitry configured to: infer, by executing inference by an artificial intelligence algorithm, specific adjustment candidate identification information as adjustment identification information from the plurality of adjustment candidate identification information according to the input information; and select specific contents candidate information as adjustment contents information from the contents database using the adjustment identification information; and an interface configured to output the adjustment contents information to the host computer.

The present invention is also directed to techniques to protect information in the computer system.

According to aspect of the present invention, the computer system includes: a host computer generating input information; and a memory system connected to the host computer. The memory system includes: a storage configured to store application program executed by the host computer, a contents database relating various contents candidate information used by the host computer with either of plural adjustment candidate identification information, and input information inputted from the host computer; circuitry configured to: infer, by executing inference by an artificial intelligence algorithm, specific adjustment candidate identification information as adjustment identification information from the plurality of adjustment candidate identification information according to the input information; and select specific contents candidate information as adjustment contents information from the contents database using the adjustment identification information; and an interface configured to output the adjustment contents information to the host computer.

According to another aspect of the present invention, the computer system includes: a host computer executing application program; and a memory system connected to the host computer. The host computer includes: first storage configured to store a plurality of notice candidate information; first circuitry configured to: collect collection information expressing a situation; and infer, by executing inference by an artificial intelligence algorithm, specific notice candidate information as notice information from the plurality of notice candidate information according to the collection information; and first interface configured to output the notice information to the memory system. The memory system includes: second storage configured to store the application program, and a contents database relating various contents candidate information used by the host computer with either of plural adjustment candidate identification information; second interface configured to receive the notice information outputted from the first interface; and second circuitry configured to: infer, by executing inference by an artificial intelligence algorithm, specific adjustment candidate identification information as adjustment identification information from the plurality of adjustment candidate identification information according to the notice information outputted by the first interface; and select specific contents candidate information as adjustment contents information from the contents database using the adjustment identification information. The second interface outputs the adjustment contents information to the host computer.

The present invention is also directed to an information protection method for information stored in a memory system connected to a host computer generating input information.

According to aspect of the present invention, the information protection method includes: storing, by a storage included in the memory system, application program executed by the host computer, and a contents database relating various contents candidate information used by the host computer with either of plural adjustment candidate identification information; storing, by the storage, the input information inputted from the host computer; inferring, by executing inference by an artificial intelligence algorithm executed by a circuitry that is included in the memory system, specific adjustment candidate identification information as adjustment identification information from the plurality of adjustment candidate identification information according to the input information; selecting, by the circuitry, specific contents candidate information as adjustment contents information from the contents database using the adjustment identification information; and outputting, by an interface included in the memory system, the adjustment contents information to the host computer.

The present invention is also directed to an information protection method for information stored in a memory system connected to a host computer includes first storage, first circuitry, and first interface.

According to aspect of the present invention, the information protection method includes: storing, by second storage included in the memory system, application program executed by the host computer, and a contents database relating various contents candidate information used by the host computer with either of plural adjustment candidate identification information; storing, by the first storage, a notice database relating various notice candidate information outputting to the memory system with either of plural notice candidate identification information; transmitting, by second interface included in the memory system, the application program to the host computer; storing, by the first storage, the application program received from the memory system; collecting, by the first circuitry, collection information expressing a situation; inferring, by executing inference by an artificial intelligence algorithm executed by the first circuitry, specific notice candidate information as notice information from the plurality of notice candidate information according to the collection information; transmitting, by the first interface, the notice information to the memory system; inferring, by executing inference by an artificial intelligence algorithm executed by second circuitry that is included in the memory system, specific adjustment candidate identification information as adjustment identification information from the plurality of adjustment candidate identification information according to the notice information; selecting, by the second circuitry, specific contents candidate information as adjustment contents information from the contents database using the adjustment identification information; and outputting, by second interface included in the memory system, the adjustment contents information to the host computer.

These and other objects, features, aspects and advantages of the present invention will become more apparent from the following detailed description of the present invention when taken in conjunction with the accompanying drawings.

BRIEF DESCRIPTION OF THE DRAWING

FIG. 2 shows an example of a contents database in the preferred embodiment.

FIG. 12 shows an example of a notice database in the still other preferred embodiment.

FIG. 13 shows an example of a notice information in the still other preferred embodiment.

DETAILED DESCRIPTION OF DISCLOSED EMBODIMENTS

Figure 1:
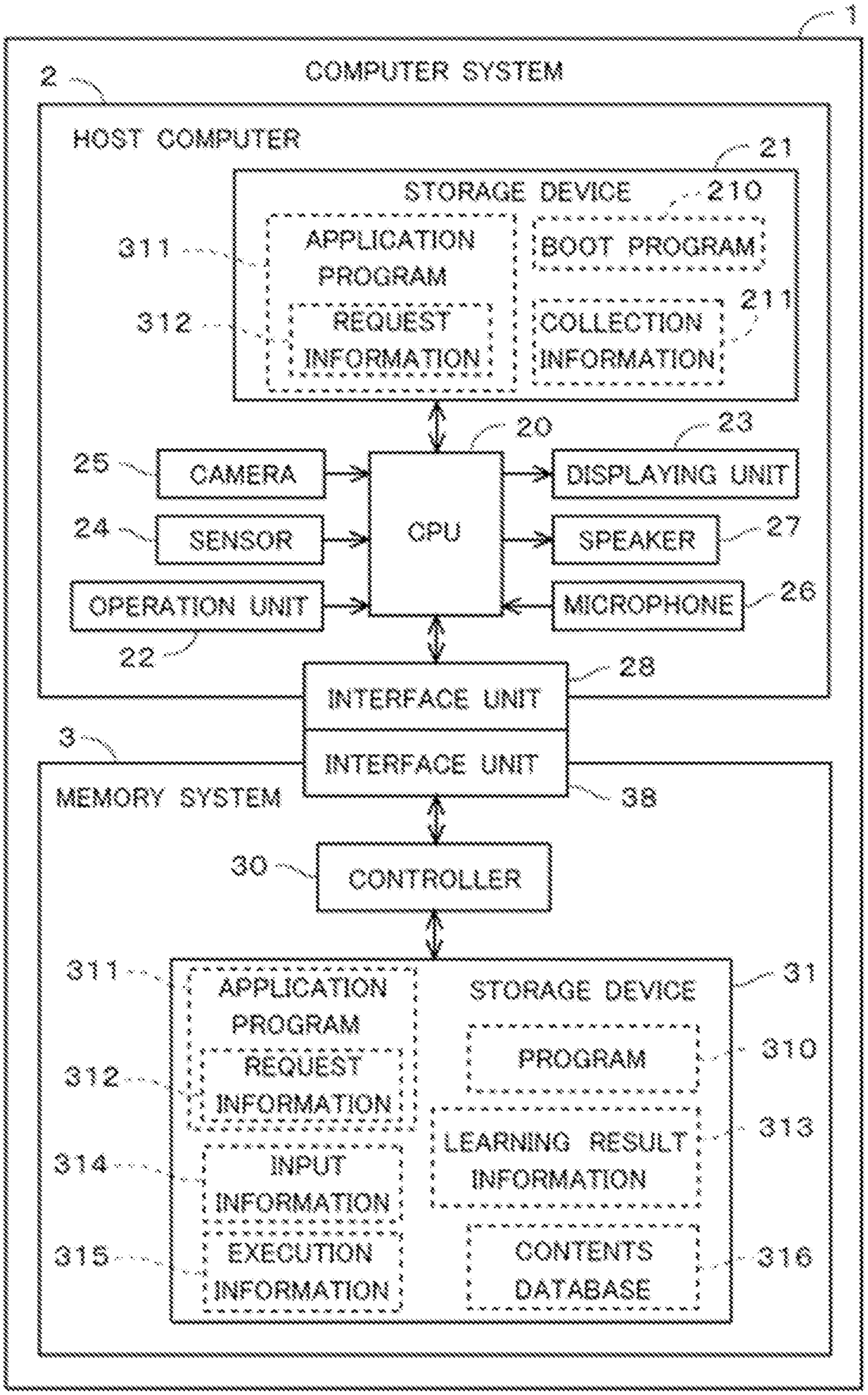
FIG. 1 is a block diagram of a computer system in a preferred embodiment.

One or more embodiments are described in detail below with reference to the accompanying drawings. In the following description, the descriptions related to directions and orientations correspond to those in the drawings for convenience of the description unless otherwise described, but are not intended to limit products for which the present invention is put into practice, manufactured products, or the scope of patent rights, for example.

FIG. 1 is a block diagram of a computer system 1 in a preferred embodiment. The computer system 1 includes a host computer 2 and a memory system 3.

In the following description, an application program 311 which is provided by the computer system 1 is a game program, as an example. As such the computer system 1, a game machine for home use etc. can be assumed, for example. However, the application program 311 is not limited to the game program. For example, as such an application, what manages a user's health, what provides guidance for pedestrians, are assumed. In the computer system 1, the user can actuate various applications according to changing the application program 311.

The host computer 2 includes a CPU 20, a storage device 21, an operation unit 22, and a displaying unit 23.

Boot program 210 shown in FIG. 1 is executed by the CPU 20 when the host computer 2 is started.

Collection information 211 is information which is collected and recorded according to request information 312 in the host computer 2. The collection information 211 is information which is transmitted towards the memory system 3. In the host computer 2, whenever collection timing comes, various information is collected by controlling various hardwares (mention later), and the collection information 211 is generated according to the collected various information. In the following description, unless it especially explains, the collection timing shall be set up to come in a predetermined cycle. The collection timing can be defined in the application program 311, for example. Moreover, the collection timing may be included in the request information 312. In addition, the collection information 211 is information expressing a situation, but its details are mentioned later.

The application program 311 is a program which is stored in the memory system 3. However, the application program 311 is transmitted (loaded) towards the host computer 2, and is stored also in the storage device 21. If needed, the application program 311 stored in the storage device 21, may be deleted in part (or all). The application program 311 includes the request information 312.

The request information 312 indicates what kind of information is required by the memory system 3 (the application program 311) as the collection information 211 (input information 314). The information which is indicated by the request information 312 is information specified out of the information which the host computer 2 can collect.

The request information 312 shown in FIG. 1 is included in the application program 311 stored in the memory system 3. Therefore, when the application program 311 is loaded to the host computer 2, the request information 312 is also transmitted to the host computer 2 and is stored in the storage device 21.

Thus, when the application program 311 includes the request information 312, the request information 312 for exclusive use can be prepared for each of application program 311. However, including the request information 312 in the application program 311 is not necessary structure. In the storage device 31, the application program 311 and the request information 312 can be stored independently. For example, the application program 311 may be stored in a ROM in the storage device 31, and the request information 312 may be stored in a RAM in the storage device 31. Thus, if the application program 311 is associated with the request information 312 for the application program 311, it is enough.

The CPU 20 reads the boot program 210 and the application program 311 which is loaded from the memory system 3, and the CPU 20 executes them. That is, the CPU 20 calculates various types of data and generates a control signal. Thus, the CPU 20 has a function of controlling respective components included in the host computer 2, and the CPU 20 has a function of calculating and generating various types of data. That is, the host computer 2 is configured as a general computer.

The storage device 21 provides a function of storing various types of data in the host computer 2. In other words, the storage device 21 stores electronically fixed information in the host computer 2.

As the storage device 21, a RAM and a buffer used as a temporal working area of the CPU 20, a read-only ROM, a non-transitory memory (e.g., a NAND memory), a hard disk storing a relatively large amount of data, a portable recording medium (e.g., a CD-ROM, a DVD-ROM, a PC card, an SD card, a USB memory) mounted onto a dedicated reader device can be considered, for example. In FIG. 1, the storage device 21 is shown as if it formed a single structure. However, the storage device 21 is usually formed by more than one of the above listed various types of devices (or medium), which are employed as necessary. That is, the storage device 21 is a general term referring to devices each having a function of storing data.

The actual CPU 20 is an electronic circuit including therein a RAM that allows a high-speed access thereto. Such a storage device included in the CPU 20 is described as being also included in the storage device 21 for convenience of the description. That is, it is described that data temporarily stored by the CPU 20 itself is also stored in the storage device 21.

As shown in FIG. 1, the storage device 21 is used for storing the boot program 210, the collection information 211, the application program 311, and the request information 312. However, the information storing by the storage device 21 is not limited to these. As stored information by the storage device 21, the adjustment contents information 320 (refer to FIG. 3) which has been loaded from the memory system 3, the information displaying on the displaying unit 23, or the sound information reproducing by the speaker 27, are stored, for example.

The operation unit 22 is hardware operable by the user of the computer system 1 for giving an instruction to the host computer 2. As the operation unit 22, various keys, buttons, switches, a touch panel, pointing devices, jog dials, and the like are considered. When the user operates the operation unit 22, various information is inputted according to the user's operation. Thus, the inputted information is transmitted to the CPU 20.

The CPU 20 selects the information inputted by the operation unit 22 by referring to the request information 312. The CPU 20 makes the storage device 21 store the inputted information by making the part or all of the inputted information into the collection information 211. That is, the information inputted by the operation unit 22 may be included in the collection information 211. By the way, the information included in the collection information 211 is finally decided by the request information 312. Therefore, when the request information 312 does not request the information inputted by the operation unit 22, the collection information 211 may not include such information.

In this way, the host computer 2 (the CPU 20) can collect the collection information 211 efficiently by referring to the request information 312. However, the request information 312 is not the indispensable requirements for carrying out the present invention. Even if the request information 312 does not exist, the host computer 2 is able to collect the collection information 211. For example, selecting all of the inputted information by the operation unit 22 as the collection information 211 is acceptable.

The displaying unit 23 is hardware having a function of displaying various kinds of information to the user to provide the information. As the displaying unit 23, a lamp, an LED, a liquid crystal display, a liquid crystal panel, and the like are considered.

Additionally, the host computer 2 includes a sensor 24, a camera 25, a microphone 26, a speaker 27 and an interface unit 28.

The sensor 24 measures and digitizes the surrounding environment, and transmits it to the CPU 20 as an electric signal. In FIG. 1, the sensor 24 is shown as if it formed a single structure. However, the sensor 24 is usually formed by more than one of various types of devices, which are employed as necessary. That is, the sensor 24 is a general term for the equipment group which has a function which measures and computerizes the surrounding environment.

An accelerometer, a gyroscope sensor, a magnetometric sensor, a GPS (position sensing device), an oscillating sensor, a temperature sensor, or a moisture sensor can be considered as the sensor 24, for example. However, there are not limited to such the sensors and it is not necessary to have all the sensors which are described above.

The CPU 20 selects the information inputted from the sensor 24 by referring to the request information 312. The CPU 20 makes the storage device 21 store the inputted information by making the part or all of the inputted information into the collection information 211. That is, the information inputted from the sensor 24 may be included in the collection information 211. As described above, the information included in the collection information 211 is finally decided by the request information 312. Therefore, when the request information 312 does not request the information inputted from the sensor 24, the collection information 211 may not include such information.

In addition, the CPU 20 may require information only of the required sensor 24 by referring to the request information 312 beforehand. For example, when the information about geomagnetism is not requested in the request information 312, changing the magnetometric sensor to a sleep state (state which stopped magnetic detection) is permitted for the CPU 20. Thus, when the CPU 20 stops the sensor 24 without necessity, the load of the computer system 1 is reduced.

The camera 25 is equipped with an optical system, a photoelectric conversion element, etc. (not shown), and constitutes the general digital camera. By capturing the subject within the photographing range in the circumference, the camera 25 acquires picture information (image information), and transmits it to the CPU 20.

The CPU 20 selects the information inputted from the camera 25 by referring to the request information 312. The CPU 20 makes the storage device 21 store the inputted information by making the part or all of the inputted information into the collection information 211. That is, the information inputted from the camera 25 may be included in the collection information 211. As described above, the information included in the collection information 211 is finally decided by the request information 312. Therefore, when the request information 312 does not request the information inputted from the camera 25, the collection information 211 may not include such information.

The microphone 26 changes the observed sound (aerial vibration) in the surrounding environment into an electric signal (sound information), and transmits it to the CPU 20.

The CPU 20 selects the information inputted from the microphone 26 by referring to the request information 312. The CPU 20 makes the storage device 21 store the inputted information by making the part or all of the inputted information into the collection information 211. That is, the information inputted from the microphone 26 may be included in the collection information 211. As described above, the information included in the collection information 211 is finally decided by the request information 312. Therefore, when the request information 312 does not request the information inputted from the microphone 26, the collection information 211 may not include such information.

The speaker 27 is hardware which has a function which reproduces and outputs sound based on the sound information (not shown). The speaker 27 reproduces game music, a sound effect or a voice of person, etc. according to the control from the CPU 20, for example.

The interface unit 28 has a function which connects in the state in which information communications with the interface unit 38 of the memory system 3 are possible. That is, information communications become possible between the host computer 2 and the memory system 3 by connecting the interface unit 28 with the interface unit 38 of the memory system 3. In this state, electric power is also supplied to the memory system 3. That is, the memory system 3 receives supply of electric power from the host computer 2 by connecting to the interface unit 28. Furthermore, the interface unit 28 has a function which enables free connecting and disconnecting to the memory system 3. Therefore, the user can pull out the memory system 3 connected, and connect another memory system 3. That is, the user can exchange the memory system 3.

In addition, besides the composition shown in FIG. 1, the host computer 2 may be equipped with the communications unit. In this case, the host computer 2 may have a function linking to the Internet etc., for example. For example, the host computer 2 may be constituted so that various information may be downloaded from external server equipment through the Internet. Moreover, the host computer 2 may be equipped with a vibrator. By vibrating the vibrator according to the execution situation of the application program 311, etc., a sense of reality of the user is increased, for example.

As shown in FIG. 1, the memory system 3 connected to the host computer 2 includes a controller 30, a storage device 31 and an interface unit 38. As described above, the memory system 3 is constituted so that connecting and disconnecting are possible. Therefore, the user can exchange the memory system 3. However, connecting and disconnecting freely is not necessary constitution for the memory system 3.

In the following description, the controller 30 is explained as FPGA (Field Programmable Gate Array). The FPGA is equipped with the logic component (logical block) in which programing is possible. Additionally, the FPGA is equipped with the wiring class which carries out interconnection of these logical blocks and which can be reconfigured. Thereby, the FPGA is an integrated circuit which can set up composition after manufacture. The FPGA is a hardware component which demonstrates power to parallel operation and convolution operation. However, the controller 30 may be a DSP or such as a CPU with comparatively high flexibility.

The controller 30 calculates various types of data. The controller 30 has a function of generating various types of data. That is, the memory system 3 is configured as a general computer.

The storage device 31 provides a function of storing various types of data in the memory system 3. In other words, the storage device 31 stores electronically fixed information in the memory system 3.

As the storage device 31, a RAM and a buffer used as a temporal working area of the controller 30, a read-only ROM, a non-transitory memory (e.g., a NAND memory), etc. can be considered, for example. In FIG. 1, the storage device 31 is shown as if it formed a single structure. However, the storage device 31 is usually formed by more than one of the above listed various types of devices (or medium), which are employed as necessary. That is, the storage device 31 is a general term referring to devices each having a function of storing data.

The controller 30 is an electronic circuit including therein a memory or a non-transitory memory that allows a high-speed access thereto. Such a storage device included in the controller 30 is explained as being also included in the storage device 31 for convenience of the description. That is, it is explained that data temporarily stored by the controller 30 itself is also stored in the storage device 31. As shown in FIG. 1, the storage device 31 is used in order to store a program 310, the application program 311, learning result information 313, the input information 314, execution information 315, and a contents database 316. However, the information storing by the storage device 31 is not limited to these.

The program 310 is the information for reconfiguring the controller 30 if needed. Before shipment, the controller 30 which is FPGA fix the arithmetic algorithm once. This operation is done by determining the state of the logical blocks, the wiring class which carries out interconnection of them, etc. In the following description, the controller 30 of this state is called "the configured controller 30". On the other hand, reconfiguring the configured controller 30 is possible (change of an arithmetic algorithm is possible) based on the program 310. However, in the following description, detailed explanation is omitted about reconfiguration of the controller 30 by the program 310. Moreover, when the controller 30 is constituted as an arithmetic circuit which needs software during operation like a CPU or a MPU (Micro Processing Unit), the program 310 is a program executed by the controller 30 during operation.

The application program 311 is a program which is executed by the host computer 2. The application program 311 is transmitted from the memory system 3 and loaded in the storage device 21 of the host computer 2. The application program 311 is executed by the CPU 20 while reading. As described above, the application program includes the request information 312.

The learning result information 313 is information used at the time of the inference processing (describe later) executing by the artificial intelligence realized by the controller 30. The learning result information 313 consists of arithmetic coefficients, threshold values, etc. which are used for the inference processing, for example. The learning result information 313 is information generated as a result of the learning processing beforehand performed with external device etc., and is stored by the storage device 31.

As the generating technique of the learning result information 313, learning by a genetic algorithm, clustering used in unsupervised learning, generating by the support vector machine used in supervised learning, and deep learning used for a multilayer neural network, etc. is known. That is, the learning result information 313 consists of information relevant to the artificial intelligence algorithm adopted. For example, the learning result information 313 is the information relating to the learnt network models which are adopted (the number of layers, the kind of each layers, the number of nodes/units, weight, an activating function, etc.). Additionally, the learning result information 313 is the information including the kind of input information 314 needed when performing inferring, and the number of bits/channels, etc. Therefore, the contents and structure of the learning result information 313 change with artificial intelligence algorithms adopted.

For convenience of the description, the learning result information 313 has been explained as if it is stored in the storage device 31. However, the controller 30 which is FPGA in the preferred embodiment is constituted in the state in which the configured controller 30 has reflected the learning result information 313. On the other hand, when hardwares, such as a CPU, are adopted as the controller 30, the learning result information 313 is given to the controller 30 as parametric information (stored in the storage device 31) etc.

In the following description, the learning result information 313 is explained as fixed information. However, the learning result information 313 may be updated by the learning processing after shipment, and suitably referred by the controller 30. Or the learning result information 313 may be uploaded to a server. In this case, after optimizing the learning result information 313 by the server side, it may be downloaded. Thus, the controller 30 may be reconstructed by the updated learning result information 313.

The input information 314 is the collection information 211 inputted from the host computer 2 to the memory system 3. The collection information 211 collected (recorded) in the host computer 2 is transmitted to the memory system 3, and is stored by the storage device 31 as the input information 314.

The execution information 315 is information which is acquired as a result as which the controller 30 analyzed the input information 314. The controller 30 analyzes the input information 314 (the collection information 211) inputted from the host computer 2, and generates the execution information 315. Then, the controller 30 makes the storage device 31 store the execution information 315. Although the details will be described later, the controller 30 infers (inference processing by artificial intelligence) suitable adjustment according to the execution information 315.

As described above, the execution information 315 is information generated according to the input information 314. Therefore, for the controller 30, inferring according to the execution information 315 is indirectly equivalent to inferring according to the input information 314.

The contents database 316 shown in FIG. 1 is a database of the table structure which associated various information mutually.

FIG. 2 shows an example of the contents database 316 in the preferred embodiment. The contents database 316 is constituted by a plurality of records. Each record of the contents database 316 has two items (area to store data).

The adjustment candidate identification information 317 is stored in first item of each record. Moreover, the contents candidate information 318 is stored in second item of each record. Therefore, by storing the contents database 316, the storage device 31 stores a plurality of adjustment candidate identification information 317, and stores a plurality of contents candidate information 318. The plurality of adjustment candidate identification information 317 is peculiar values with which each does not overlap mutually. Thus, in the contents database 316, one record is generated to each of the adjustment candidate identification information 317 from which a value differs.

Generally speaking, when the program is executed, a situation is not constant, and changes. On the other hand, if the contents used in the program are changed, the application (for example, a situation in a game) provided by this program is changed. Therefore, if the information expressing the contents which can be used in the application program 311 is changed (is adjusted) according to a situation in which the application program 311 is being executed, providing the application which is adapted for the situation becomes possible for the application program 311. Although the details will be described later, the application program 311 can be adjusted to fit the situation, according to changing the information expressing the contents which can be used in the application program 311. Saying more strictly, after the information expressing the contents is changed, the application is adjusted at a time at which the changed information was actually used by application.

The designer of the application program 311 (hereinafter referred to as "the designer") imagines various "situations" which may arise when the application program 311 is executed. It is preferred that the designer assumes "situations" depending on the phenomenon in which it is appropriate to change operation of the computer system 1, and gives definitions of the "situations". For example, if it is desirable to change operation according to the sex of a player (user), "the user's sex" can be adopted as the phenomenon, and "the situation which the male is playing" and "the situation which the woman is playing" can be presumed as the "situations".

For example, the user's play environment (indoor, outdoor, inside of vehicle, controller's type, etc.), the user's play history (the number of play times, play time, a selection history, etc.), the user's mental situations (be angry, be enjoying, etc.), or the user's personal information (age, sex, nationality, an address, a peculiarity, a preference, etc.) are assumed as the phenomena by the designer. However, the assumed phenomena are not limited to them, and all of them are not necessary to be assumed.

The designer assigns the adjustment candidate identification information 317 whose values differ mutually to each of assumed situations. Therefore, each adjustment candidate identification information 317 is information to which different assumed situations are assigned. In other words, the adjustment candidate identification information 317 whose values differ mutually is information which shows the situation where each differs mutually.

Next, the designer determines "adjustment" suitable for each according to assumed various situations, and prepares beforehand. That is, the designer designs suitable adjustment for every assumed situation. Thereby, each of adjustments which are prepared are different adjustments mutually.

In the following description, it shall be described as "adjustment" that at least one of the information which expressed the contents which can be used in the host computer 2 is changed according to the adjustment contents information 320 (see FIG. 3). Therefore, the information which is changed according to the adjustment contents information 320 is not limited to the information which the application program 311 uses. That is, changing the information which expressed the contents used by the programs (programs other than the application program 311 are included) which are executed by the host computer 2 is included as "adjustment". On the other hand, for example, saved-data etc. are imagined as the information expressing the contents which can be used by the application program 311. However, even if saved-data is changed, the application is not changed according to the adjustment contents information 320. Therefore, it shall not correspond to "adjustment" in the following description.

Moreover, the application program 311 includes, for example, the information (for example, information of a title screen) expressing the contents to be used regardless of adjustment (being common in all adjustments), and the information (for example, character's information which is deleted after adjustment and does not appear, information which is rewritten after adjustment) expressing the contents to be used until adjusted. Therefore, as a result, even if any adjustment is not performed, the application program 311 can provide a game without a trouble.

Thus, each prepared "adjustment" is a candidate of "adjustment" at least until it is decided to be provided by the computer system 1. The designer associates one of the adjustment candidate identification information 317 with one of the adjustment candidate. Thereby, adjustment candidate identification information 317 and prepared adjustment becomes one-to-one correspondence. Therefore, according to specifying the adjustment candidate identification information 317, a desired adjustment can be specified from a plurality of adjustment candidate. That is, the adjustment candidate identification information 317 is an identifier for identifying a specific adjustment candidate (becomes actually "adjustment") out of a plurality of prepared adjustments.

As the example shown above, it is possible to presume a plurality of "situations (male or female)" from one "phenomenon (a user's sex)", and it is also possible to prepare "adjustment" for each of presumed "situations". However, if the situation is presumed only from one phenomenon, the variation of the presumed situation may be limited. In the previously described example, once operation is changed according to the user's sex, changing the operation will never occur after that for this user.

Therefore, further combining a plurality of situations which arise according to a plurality of phenomena, the designer presumes more complicated situations and defines each of them. For example, the designer defines "the number of times of a play" and "level" as a plurality of phenomena. From the phenomenon of "the number of times of a play", "few", "average", or "many" are defined as a plurality of situations. Moreover, from the phenomenon of "level", "low", "middle", or "high" are defined as a plurality of situations.

If the situations are "few" and "low", the situation is defined as "beginner". If the situation is "beginner", making the weak enemy appear is desirable. Additionally, in this case, displaying in detail the backgrounds (story etc.) of the game, and explaining in detail the operation method, etc., are desirable.

On the other hand, if the situations are "low (same situation)" and "many (different situation)", the situation is not defined as "beginner" but another situation. In this situation, making the weak enemy appear is still desirable. However, in this case, displaying in detail the backgrounds of the game, and explaining in detail the operation method, etc., are not desirable because the user already knows them. In this case, it is preferable to simplify them.

In the following explanation, the "situation" assumed by one phenomenon may be called "partial situation". In addition, the "situation" used as the object which prepares "adjustment" may be called "whole situation". Thereby, both may be distinguished. The situation "beginner" is "whole situation". On the other hand, the situations "low" or "average" are "partial situations".

The contents candidate information 318 shown in FIG. 2 is information prepared for adjustment by the designer, and is information expressing various contents. Not all of contents prepared and stored in the contents database 316 are actually used by the application program 311. For example, as for the contents which are used alternatively according to the situation (adjustment), if one is used, another will not be used. Moreover, not the information used by the application program 311 but the information used by other programs which are executed in the host computer 2 is included in the contents candidate information 318. Therefore, the contents (contents only stored) which are only prepared for are only the "candidates" of the contents which can be used by the host computer 2 until being used at least is determined.

The examples of the contents candidate information 318 are image information (a character, an object, scenery, etc.), sound information (a sound effect, BGM, character's voice, etc.), other output information (vibration etc.), parametric information (the action pattern of a character, speed, strength, etc.), etc. The contents candidate information 318 is not limited to the information enumerated above.

Moreover, in a different game, a different character usually appears. That is, it is different for each application program 311 what kind of contents candidate information 318 are needed by application program 311. Therefore, the contents candidate information 318 is information which is prepared for every application program 311.

The adjustment candidate identification information 317 and the contents candidate information 318 which were stored in the same record are mutually associated in the contents database 316 by being stored in the same record. That is, the contents database 316 stored by the storage device 31 is the information which related the information (the contents candidate information 318) expressing the contents which can be used by the host computer 2, to one of the adjustment candidate identification information 317.

The contents candidate information 318 may include information other than the information which is used by the application program 311. For example, the contents candidate information 318 may be information expressing an "advertisement" which has a thin relation with the application program 311. For example, at the time at which the application program 311 is not being executed (for example, at the time at which another application program is being executed), such an advertisement may be provided. Preparing for the situation in which the user plays frequently sport experience type game (provide by the application program 311), adjustment which provides the advertisement of sporting goods at time except the time to play the such game can be considered. Even if the advertisement is displayed during execution of the application program 311 (under the play of the game), there is a risk in which the degree of user's attention may decrease. However, a timing in which the user's attention may be high situation can be presumed. If the advertisement is displayed on the such presumed timing, it may be possible to provide more effective advertisement. Therefore, although the contents candidate information 318 expressing such an advertisement is information which can be used by the host computer 2, it is not information used by the application program 311.

Usually, the contents which are changed in order to realize specific adjustment are plural. Therefore, the contents candidate information 318 which is related with the specific adjustment candidate identification information 317 is aggregate of the information expressing the contents which are needed in order to realize adjustment identified using the adjustment candidate identification information 317. For example, the contents candidate information 318 which is related with the one adjustment candidate identification information 317 contains the picture information of the 1st character (one contents), and the picture information of the 2nd character (another contents) which is different from the 1st character. However, changing the plural contents is not for all adjustment. Thus, the number of the contents changing by one adjustment may be one.

In addition, in the contents candidate information 318 which is respectively related with the different adjustment candidate identification information 317, a part of information may be same. For example, the information expressing "first supporter" and the information expressing "second supporter" are included in the contents candidate information 318 related with the adjustment for "low". On the other hand, although the information expressing the "first supporter" is included in the contents candidate information 318 related with the adjustment for "middle", the information expressing the "second supporter" is not included. By such adjustment, although the "first supporter" appears in common in the "low" and the "middle", the "second supporter" does not appear in a "middle". Therefore, the contents candidate information 318 related with the different adjustment candidate identification information 317 (each of them corresponds to different adjustment) can realize mutually different adjustment, if they are not completely the same.

Moreover, it is possible that information expressing the contents (contents which are not changed in different adjustment) which are not the targets of adjustment is commonized with all the contents candidate information 318.

As already described above, in the preferred embodiment, information expressing the contents which are not the targets of adjustment considers as the application program 311. Therefore, such information is contained in the application program 311. In such a case, the information expressing the contents included in the application program 311 is not contained in the contents database 316. That is, the contents database 316 containing all the contents that the application program 311 uses is not necessary.

The adjustment candidate identification information 317 is the information which has a peculiar value with which each does not overlap mutually, as described above. Therefore, if the adjustment candidate discernment information 317 is specified, it is possible to search the contents database 316 by using the specified adjustment candidate identification information 317 as a search key. Although the details will be described later, the memory system 3, by performing such a search, can select the contents candidate information 318 which is related with the adjustment candidate identification information 317 used as a search key from the contents database 316.

Returning to FIG. 1, the interface unit 38 has a function which connects the memory system 3 to the host computer 2, in the state in which information communications with the host computer 2 are possible. In addition, the interface unit 38 has a function which enables free connecting and disconnecting to the memory system 3. That is, the interface unit 38 and the interface unit 28 constitute a connector. Thereby, the information inputted from the host computer 2 is received by the interface unit 38. Moreover, the interface unit 38 transmits the information transmitted from the controller 30 to the host computer 2.

In addition, FIG. 1 is illustrating that the controller 30 controls all of the input and output of the information between the host computer 2 and the storage device 31 of the memory system 3. However, it is possible to establish the controller which performs access to the storage device 31 specially as another composition which is different from the controller 30.

Figure 3:
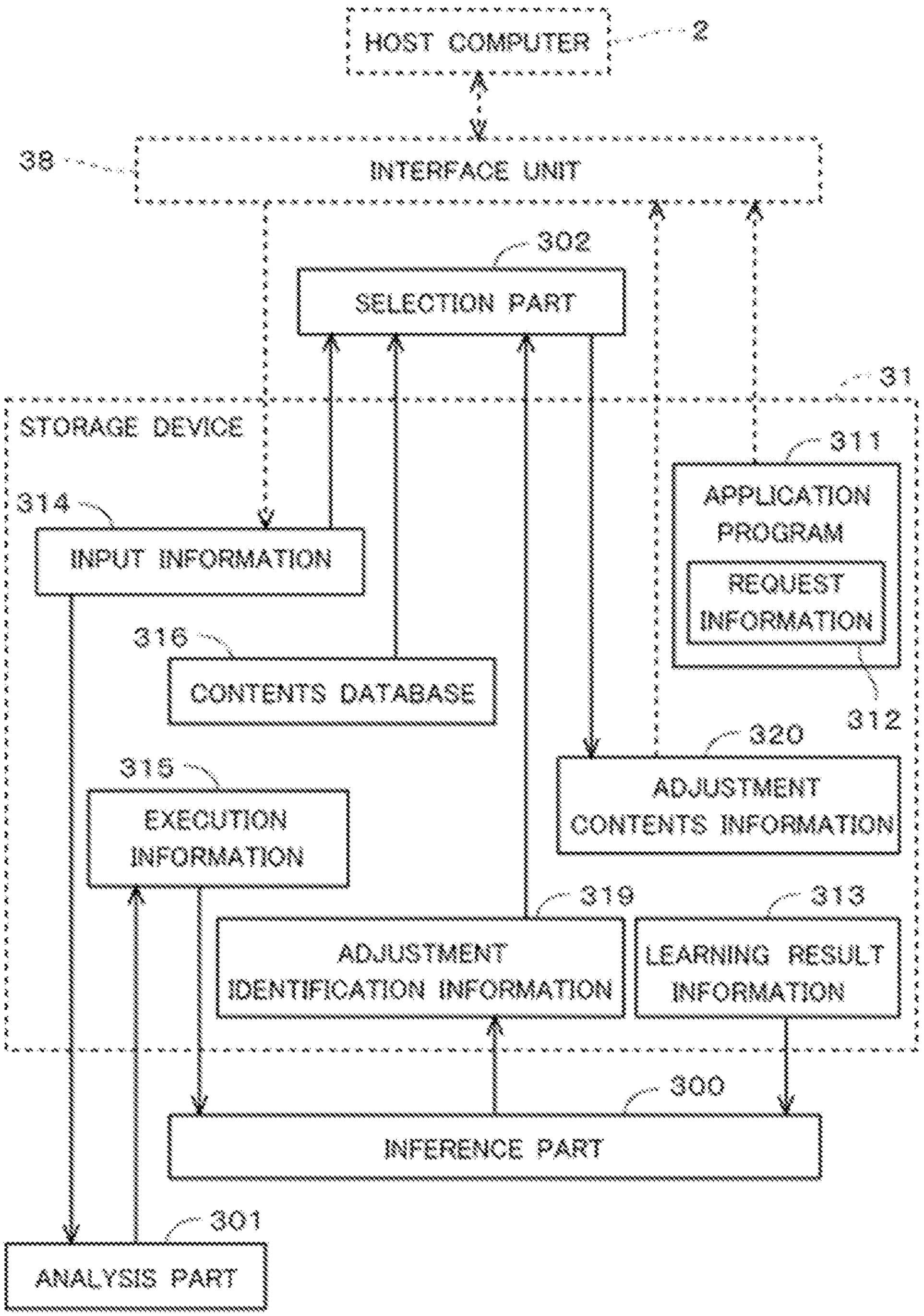
FIG. 3 shows functional blocks included in a configured controller in the preferred embodiment, with a data flow.

FIG. 3 shows functional blocks included in the configured controller 30 in the preferred embodiment, with a data flow. An inference part 300, an analysis part 301, and a selection part 302, that are shown in FIG. 3 are the functional blocks achieved by the controller 30.

The inference part 300 executes inference by an artificial intelligence algorithm using the learning result information 313. The inference part 300, by inferring according to the input information 314, selects the specific adjustment candidate identification information 317 as the adjustment identification information 319 from the plurality of adjustment candidate identification information 317. Although the inference part 300, according to the input information 314, decides the adjustment identification information 319, but the input of the inference part 300 is execution information 315. Therefore, as direct, the inference part 300, according to the execution information 315, decides the adjustment identification information 319.

In other words, an artificial intelligence algorithm and the learning result information 313 are designed so that the optimal adjustment identification information 319 may be inferred, according to the execution information 315 which inputted into the inference part 300. And the controller 30 is configured according to such design. In addition, the artificial intelligence algorithm for performing such inferring is realizable by adopting the conventional technology suitably. Therefore, the detailed explanation about the artificial intelligence algorithm which the inference part 300 performs is omitted.

The execution information 315 is generated based on the collection information 211 observed and collected by the host computer 2. Therefore, the execution information 315 is the information expressing the situation when the collection information 211 was collected. The inference by the inference part 300 judges which of assumed situations (assumed by the designer) are real situation currently expressed by the collection information 211, and selects a specific adjustment candidate from the plurality of adjustment candidates which are prepared, as the optimal adjustment.

Thereby, the adjustment (adjustment identified by the adjustment identification information 319) actually provided is determined out of the plurality of adjustment candidates (adjustment candidates identified by the adjustment candidate identification information 317) that the designer prepares. Moreover, the inference part 300 has the function to make the storage device 31 store the adjustment identification information 319.

The analysis part 301 analyzes the input information 314 which is inputted from the host computer 2, and it makes the storage device 31 store the analysis result as the execution information 315.

As described above, the input information 314 in the preferred embodiment is information equivalent to the collection information 211. And the collection information 211 is information detected with the operation unit 22, the sensor 24, the camera 25, and the microphone 26 in the host computer 2. The collection information 211 (the input information 314) is selected according to the request information 312. However, the input information 314 may contain the raw binary data from the sensor 24, the image data from the camera 25, and the like. In such information, the number of item and size of data are still huge.

The analysis part 301 generates the execution information 315 which is more suitable as the input to the inference part 300 (the inference processing) by performing processings to the input information 314 such as compression and a classification.

For example, the analysis part 301 may compress the input information 314 according to generating the execution information 315 by thinning out the image data and the sound-data which are included in the input information 314. The image data, voice information, etc. which are contained in the input information 314 are generated with the sampling rate according to the specifications of the camera 25 or the microphone 26. When the analysis part 301 thins out such information beforehand, the load of the inference part 300 is reduced.

Moreover, when the photographic data (image data) of the user and the sound data of the user's voice are included in the input information 314, the analysis part 301 executes recognition processing based on such information, judges the user's state of mind. Additionally, the analysis part 301, according to such judgment, generates the execution information 315 expressing the user's state of mind. Such recognition processing can adopt processing similar to the processing by the inference part 300. Even if the recognition processing is similar to the processing by the inference part 300, the load of the controller 30 may be reduced compared with the case where the inference part 300 directly performs an inference processing to the input information 314.

Moreover, the analysis part 301 performs edge processing to the image data contained in the input information 314, and may consider the information about the detected edge as the execution information 315. That is, the input information 314 may be compressed by changing pixel data into edge data.

Moreover, there may be no necessity of adjusting the game by a difference of one years old in the user's age. Therefore, when the user's age is included in the input information 314, the analysis part 301, by comparing the age with a suitable threshold value simply, classifies the user. The analysis part 301 classifies the user's age (less than 10's, early 10's, late 10's, 20's, 30's, 40's, etc.), as the execution information 315. Or analyzing the input information 314 expressing the date, the analysis part 301 may generate the execution information 315 expressing the season.

Moreover, during scheduled period, the analysis part 301 may delete the information which is not changed for a certain period from the input information 314. For example, the user's personal information, hardware organization information, and the date information, etc. are assumed as such information. Such information is not frequently changed during providing the game.

Furthermore, the analysis part 301 may convert the physical amount actually operated to the operation unit 22 collected by the operation unit 22 as the amount of operations in application. Also, the amount of operations is stored as the execution information 315. For example, when the actual operated amount to the operation unit 22 is contained in the input information 314 obtained when the car racing game was provided, converting this actual operated amount into the amount of operations of the handle in the car racing game is considered.

The analysis shown above is example of analysis by the analysis part 301, and is not limited to the above. As for the analysis by the analysis part 301, it is desirable that large influence does not come to a inferring result while the load of the controller 30 is reduced as a whole compared with the case where the inference part 300 performs inferring directly to the input information 314.

The selection part 302 has a function which selects the contents candidate information 318 which is related to the adjustment candidate identification information 317 (corresponding to the adjustment discernment information 319), from the contents database 316. The selection part 302 generates the adjustment contents information 320 based on the contents candidate information 318 which has been selected.

To describe in more detail, the selection part 302 searches the contents database 316 by using as a search key the adjustment identification information 319 (the adjustment candidate identification information 317 specified by the inference processing). By such operation, the selection part 302 selects (extracts) the contents candidate information 318 which is related to the adjustment candidate identification information 317 used as the search key, from the contents database 316. Furthermore, the selection part 302 generates the adjustment contents information 320 based on the contents candidate information 318 which is extracted. That is, the adjustment contents information 320 is equivalent to the contents candidate information 318 related to the adjustment discernment information 319 (specified adjustment candidate discernment information 317).

The contents candidate information 318 related to the adjustment candidate identification information 317 is information expressing the contents which are needed in order to realize adjustment identified by this adjustment candidate identification information 317. Therefore, the adjustment contents information 320 is information expressing contents required in order to realize adjustment identified using the adjustment identification information 319.

Thus, when the host computer 2 uses the adjustment contents information 320 which the selection part 302 selects, the optimal adjustment (the adjustment prepared) in the situation expressed by the input information 314 (the execution information 315) is realized. Thereby, the computer system 1 can adjust the application (the game) into the optimal state according to a situation, without the user's conscious operation (selection operation, for example).

Moreover, the selection part 302 in the preferred embodiment also has a function to determine the output timing of the adjustment contents information 320 which the interface unit 38 should output to the host computer 2. That is, the selection part 302 is constituted also as a timing determination unit.

The selection part 302 in the preferred embodiment, by monitoring the input information 314, determines output timing based on the information (time, user's selection operation, state of progress, for example) which is expressed in the input information 314. The selection part 302 generates the adjustment contents information 320 according to referring to the adjustment identification information 319 when the output timing determined has come. The interface unit 38 transmits the adjustment contents information 320 to the host computer 2 at the generation timing of the adjustment contents information 320. That is, in the preferred embodiment, the generation timing of the adjustment contents information 320 is substantially equivalent to the output timing.

The prepared adjustment related to the assumed situation, when the assumed situation arises, may not have to be provided immediately. For example, the prepared adjustment may be provided after predetermined time has passed. Or the prepared adjustment may be provided at the time of next start. However, the selection part 302 determines the output timing. In addition, according to the output timing which is determined, the timing by which adjustment is realized is determined substantially. Thereby, the computer system 1 can be adjusted to effective timing.

However, the technique of determining the output timing is not limited to such a technique. For example, the selection part 302 may generate the adjustment contents information 320 without being concerned in the output timing. Afterwards, when the output timing which is separately determined according to the input information 314 has come, the selection part 302 may transmit a control signal (the signal which shows output timing has come) to the interface part 38. The interface part 38 can transmit the adjustment contents information 320 to the host computer 2 at the timing at which the control signal is delivered. By constituting in this way, the output timing of the adjustment contents information 320 is also appropriately controllable.

The contents candidate information 318 is an aggregate of the information expressing various contents. The adjustment by those various contents may not have to be provided simultaneously. For example, the contents which adjust the strength of the game need to be used during playing the game. However, during playing the game, it is more desirable not to use the contents expressing the advertisement in the previously described example. Therefore, the selection part 302 determines each of output timings for each of contents which are contained in the contents candidate information 318 which is chosen according to the adjustment identification information 319.

Here, the principle whose security level of the memory system 3 improves is explained.

By only copying the application program 311, the application provided by the application program 311 is unreproducible. In order to reproduce the application, it is required to copy not only the application program 311 but all the contents candidate information 318 (the contents database 316). For example, the person (hereinafter referred to as a "malicious person") who is going to do illegal copy of such information, when the host computer 2 reads such information from the memory system 3, copies according to illegal monitoring by the device connected to the interface unit 38.

The memory system 3 transmits the application program 311 at a stroke to the host computer 2 by the command which is given from the host computer 2 at the time of a start, for example. However, the memory system 3 does not transmit the contents candidate information 318 at a stroke (such a command does not usually exist). Each contents candidate information 318 is not read out from the storage device 31, unless the input information 314 expressing the situation assumed for each is inputted into the interface unit 38. The malicious person cannot know variation (what kind of situations are prepared) and number (the number of the records in the contents database 316) of situations which is assumed. Furthermore, he cannot know what the input information 314 (what kind of the input information 314 is needed to read each adjustment contents information 320) expressing each of situations is.

Therefore, even if the malicious person tries illegal copying of all contents candidate information 318 being prepared, there is no command which reads each contents candidate information 318, and it cannot read out unless the input information 314 which is difficult to reproduce inputted. Therefore, it is not easy to read out even one contents candidate information 318 from the memory system 3.

Or even if reading out a certain contents candidate information 318 by random input information 314 is possible, it is difficult to know what situation it is provided in response to. That is, the input information 314 and the contents candidate information 318 is not one-to-one correspondence like a read-out command and its object information, but is many-to-one correspondence. Therefore, even if reading out the specific contents candidate information 318 by a certain input information 314 is possible, all of the input information 314 (it may exist infinitely) reading out this contents candidate information 318 cannot be specified by it. That is, even if reproducing the one contents candidate information 318 is possible, the record of the contents database 316 cannot be structured.

Furthermore, the output timing of the contents candidate information 318 is controlled and even the contents candidate information 318 which is not immediately outputted by inputting the input information 314 exists. In such state, it is difficult to read out all the contents candidate information 318 completely, and to copy it.

By such a principle, the memory system 3 is able to improve the security level for preventing an illegal copying.

The above is the description of the structure and functions of the computer system 1. Next, a method for protecting information using the computer system 1 is described.

Figure 4:
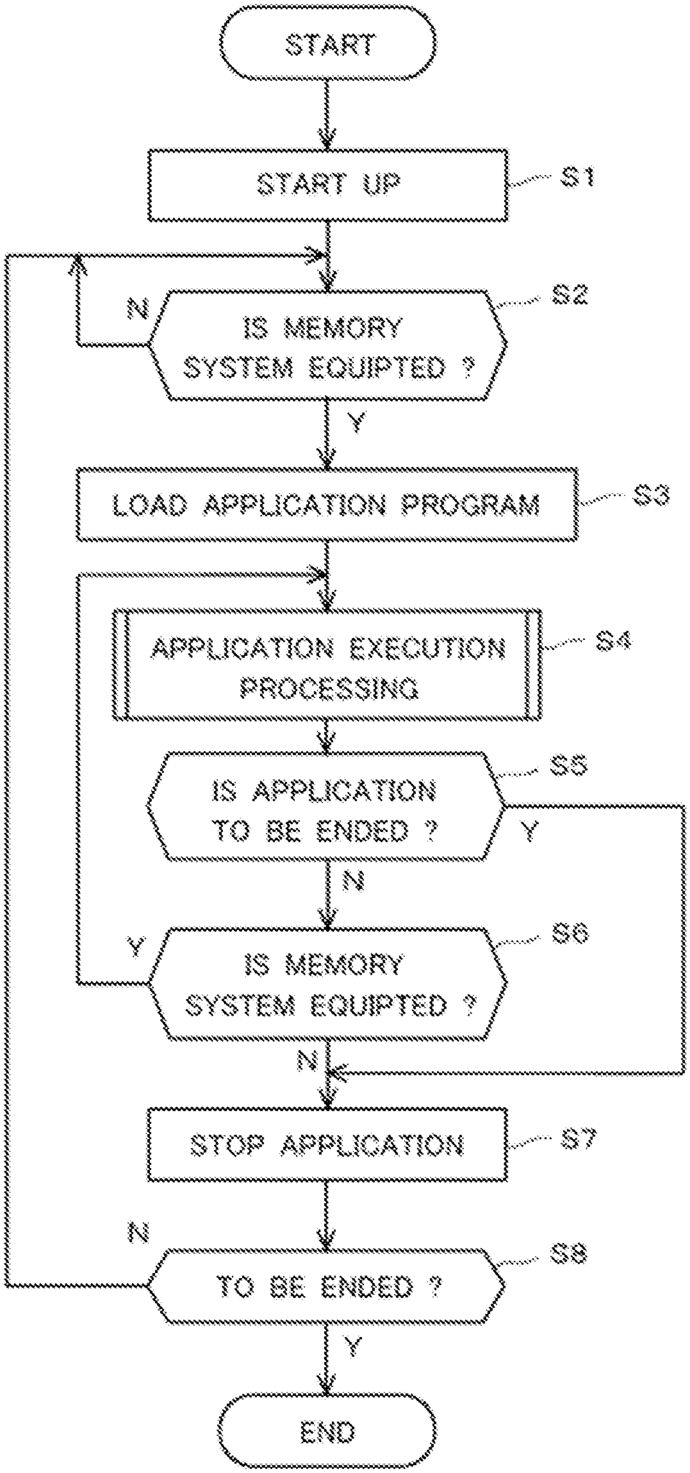
FIG. 4 is a flow chart showing information protection method executing by the computer system in the preferred embodiment.

FIG. 4 is a flow chart showing information protection method executing by the computer system 1 in the preferred embodiment. In addition, before the process shown in FIG. 4 is started, the controller 30 shall be already in a condition called "the configured controller 30". Furthermore, the program 310, the application program 311, the learning result information 313, and the contents database 316 shall be already stored in the storage device 31. That is, the process in which the memory system 3 makes the storage device 31 store such information shall have already completed.

When the process shown in FIG. 4 is started, the computer system 1 starts up (Step S1). Thereby, a power supply is supplied at least to the host computer 2. Thus, the host computer 2 is started up. At this time, the CPU 20 starts execution of the boot program 210. In addition, when Step S1 is performed and the host computer 2 is already equipped with the memory system 3, the electric power supply is supplied to the memory system 3. In this case, the memory system 3 is also started up.

Next, the CPU 20 monitors the interface part 28 and judges whether the memory system 3 has been equipped (Step S2). When the memory system 3 has not been equipped (No in Step S2), the computer system 1 is waiting by repeating Step S2.

If the CPU 20 judges the memory system 3 has been equipped (Yes in Step S2), the CPU 20 requires transmitting the application program 311 to the memory system 3. When the computer system 1 have started up and it is equipped with the memory system 3, usually the memory system 3 has been already started up. On the other hand, at this time, it can be assumed that the memory system 3 is a sleep mode. However, even if the memory system 3 is the sleep mode, it awakes up by the requirement from the CPU 20.

Therefore, as a reply to the requirement from the CPU 20, the application program 311 is loaded (transmission) from the memory system 3 (Step S3). As already described above, the application program 311 loaded at this time contains the request information 312. The request information 312 is stored by the storage device 21.

When the application program 311 has been loaded completely, the computer system 1 performs application execution processing (Step S4) shown in FIG. 4. Although the host computer 2 starts execution of the loaded application program 311 by performing Step S4, it mentions later in details.

After ending the application execution processing, the CPU 20 judges whether the application is ended or not (Step S5). The judgment in Step S5 can be judged according to whether the directions with which the user terminates the application by operating the operation unit 22, were inputted. However, for example, not the thing limited to user operation but the application program 311 may terminate the application by itself.

When the CPU 20 judges that the application is to be ended in Step S5 (Yes in Step S5), the CPU 20 finishes the application. That is, execution of the application program 311 is stopped.

On the other hand, if the CPU 20 judges that the application is not to be ended in Step S5 (No in Step S5), the CPU 20 judges further whether the host computer 2 has been equipped with the memory system 3 (Step S6). And when the host computer 2 has not been equipped with the memory system 3 (No in Step S6), the CPU 20 performs Step S7. That is, when the memory system 3 has been disconnected for a some reason, the CPU 20 also terminates the application.

If the judgement result of Step S6 is "Yes", the computer system 1 returns to Step S4, and continues the processing. Thus, the computer system 1 continues providing the application until it judges as "Yes" in Step S5 or judges as "No" in Step S6.

After Step S7 has been performed and the application has been terminated, the CPU 20 judges whether the processing by the computer system 1 is ended (Step S8).

If the judgement result of Step S8 is "No", the computer system 1 returns to Step S2. In Step S2, the computer system 1 becomes standby state until the new memory system 3 has been connected. Although it has not been described in FIG. 4, the host computer 2 may adjust during this waiting period. During this period, since the application program 311 has not been executed, the application has not been provided. Therefore, if an advertisement is displayed using the adjustment contents information 320, increasing the user's attention is expectable. As described above, the adjustment contents information 320 expressing an advertisement can be constituted as information which expressed the contents which do not need to be used by the application program 311.

On the other hand, if the judgement result of Step S8 is "Yes", the computer system 1 ends the processing. At this time, the host computer 2 and the memory system 3 stop operation.

Next, operation of the host computer 2 in the application execution processing shown in Step S4 is explained.

Figure 5:
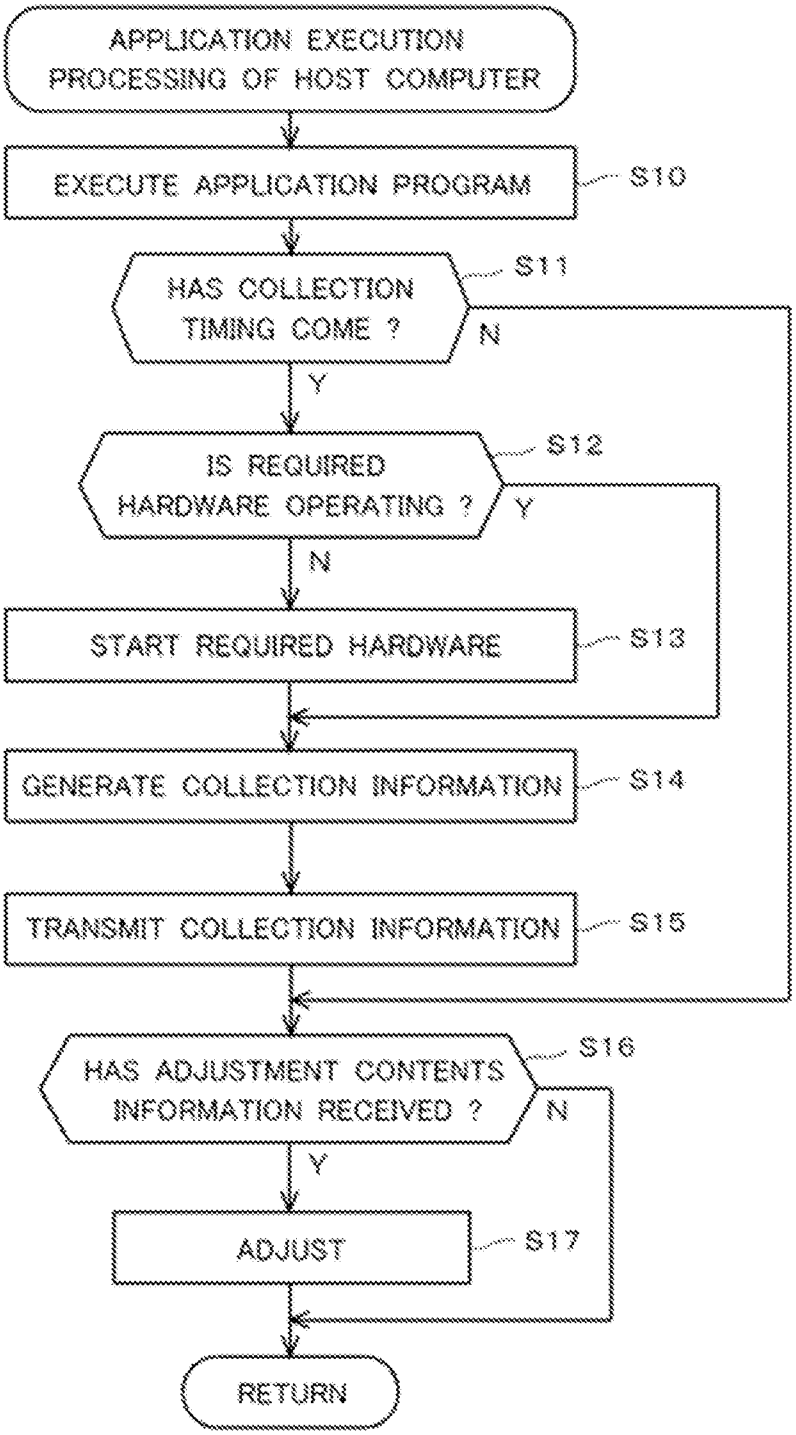
FIG. 5 is a flow chart showing executing process by a host computer in application execution processing in the preferred embodiment.

FIG. 5 is a flow chart showing executing process by the host computer 2 in the application execution processing in the preferred embodiment.

When the application execution processing has started, the CPU 20 starts execution of the application program 311 (Step S10). Before the Step S10 is performed, the Steps S1 and S3 have been already performed (See FIG. 4). Therefore, when the Step S10 is performed, the preparation in which the CPU 20 executes the application program 311 has been already complete.

Additionally, the time at which the Step S10 is performed for the first time since the application program 311 is loaded (Step S3), means the time at which the application has started. After that, the Step S4 is repeated and performed until it ends the application by performing the Step S7. By performing Step S10, whenever Step S4 is performed, the application program 311 is executed one by one, and the application progresses.

When having ended the performing of the application in Step S10, the CPU 20 judges whether collection timing has come (Step S11). As already described, in the preferred embodiment, the collection timing is a timing which collects the collection information 211. And the collection timing is being defined as coming periodically.

When the collection timing has come (Yes in Step S11), the CPU 20 specifies required hardware in order to collect the information requested in the request information 312. And the CPU 20 judges whether all of specified required hardwares are operating normally (possibility of collecting information) or not (Step S12). The hardwares which are the targets of the judgment in Step S12 are hardwares required for collection of the information demanded in the request information 312 among the operation unit 22, the sensor 24, the camera 25, and the microphone 26.

When the required hardware is not operating (No in Step S12), the CPU 20 makes the required hardware operate (Step S13). Therefore, after performing Step S13, the CPU 20 becomes a state which can collect required information (recording of the user operation by the operation unit 22, sensing by the sensor 24, image capturing by the camera 25, and recording by the microphone 26, etc.). In addition, the CPU 20 may stop hardware without necessity at Step S13. On the other hand, when all the required hardwares are operating (Yes in Step S12), the CPU 20 skips Step S13.

When Steps S12 and S13 have been performed, the computer system 1 is in a state in which all the hardwares required for collection of information are operating. In such state, the CPU 20 generates the collection information 211 based on the input signal from the required hardwares (Step S14). At this time, the CPU 20 generates the collection information 211, judging whether the obtained input signal is necessary, by referring to the request information 312 again. Therefore, the collection information 211 is the information collected according to the request information 312.

During performing Step S14, the CPU 20 is already operating only required hardware required in order to generate the collection information 211 according to reference to the request information 312. However, generation of the collection information 211 which is requested by the request information 312 may be not accomplished only by selecting hardware. For example, the following case is considered. When monochrome image information is demanded, the CPU 20 operates the camera 25 even if it is a camera acquiring color image information only. In such a case, according to the request information 312, the CPU 20 converts the color image information (acquired from camera 25) to the monochrome image information, and generates the collection information 211.

As the description above, for convenience, the CPU 20 collects all the information simultaneously, and explained that it is considered as the collection information 211 simultaneously. However, the collection timing may be different for each hardware.

As already described above, the collection information 211 transmitted towards the memory system 3 is stored as the input information 314 in the memory system 3. Therefore, it is equivalent to generating the input information 314 by the host computer 2 that the CPU 20 performs Step S14 and generates the collection information 211. That is, saying that Step S14 is the processing in which the host computer 2 generates the input information 314 is possible.

When the new collection information 211 has been generated by performing Step S14, the CPU 20 transmits the generated collection information 211 to the memory system 3 (Step S15).

In Step S11, if collection timing has not come (No in Step S11), the CPU 20 skips all of Steps S12 to S15. Thereby, when the collection timing has not come, the collection information 211 is not generated.

When the judgement result of Step S11 is "No" or Step S15 has been performed, the CPU 20 judges whether the host computer 2 has received the adjustment contents information 320 (Step S16).

When the adjustment contents information 320 has been received (Yes in Step S16), the CPU 20 makes the storage device 21 store the adjustment contents information 320 received. Thereby, according to the adjustment contents information 320, the computer system 1 adjusts the information expressing the contents which can be used by the host computer 2 (Step S17). In Step S17, the CPU 20 rewrites the information (information before adjustment) expressing the contents stored by the storage device 21 until Step S17 is executed using the adjustment contents information 320 that was newly received. However, as already explained, it may only add the adjustment contents information 320, maintaining the previous information (information before adjustment). Or adding the identifier (the adjustment contents information 320 can be used as the identifier, for example) which shows a unusable state to the previous information is also possible. Furthermore, although the previous information may be deleted, the adjustment contents information 320 "is not for adjustment" anymore in that case.

When Step S17 has been performed or the judgement result of Step S16 is "No", the host computer 2 ends the application execution processing (FIG. 4: Step S4).

The above is the description of the operation of the host computer 2 in the application execution processing.

Next, the operation of the memory system 3 in the application execution processing shown in Step S4 is explained.

Figure 6:
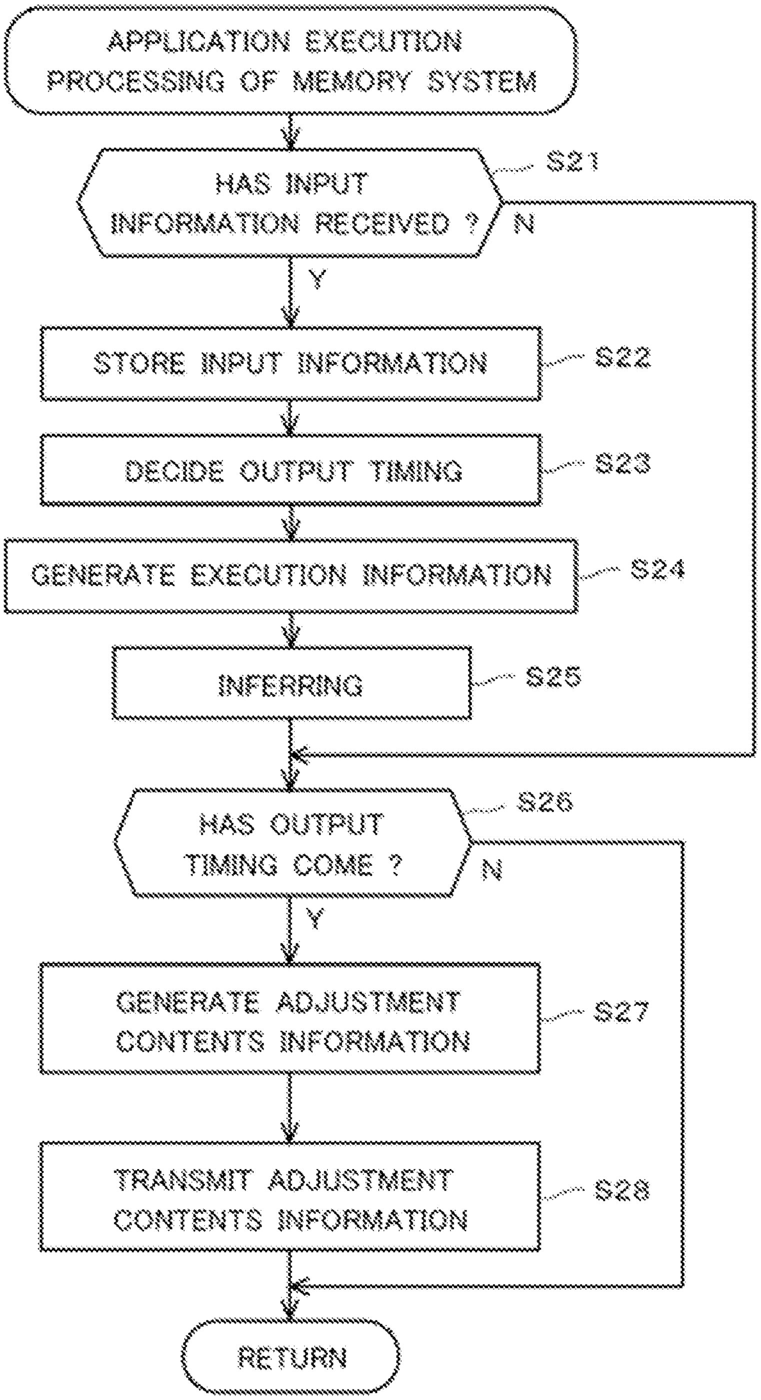
FIG. 6 is a flow chart showing executing process by a memory system in the application execution processing in the preferred embodiment.

FIG. 6 is a flow chart showing executing process by the memory system 3 in the application execution processing in the preferred embodiment. In addition, when the process shown in FIG. 6 is started, the memory system 3 has completed transmission of the application program 311 according to the load demand from the host computer 2.

When the application execution processing has been started, the memory system 3 judges whether the memory system 3 has received the input information 314 (the collection information 211) from the host computer 2 (Step S21).

When the input information 314 has been received (Yes in Step S21), the memory system 3 makes the storage device 31 store the input information 314 received (Step S22).

Moreover, the selection part 302 determines the output timing of the adjustment contents information 320 according to the input information 314 received (Step S23).

The processing of the Step S23 may be provided by following, for example. When predetermined operation is carried out, showing it in the input information 314 is possible. The selection part 302, by the input information 314 which shows that predetermined operation has been carried out, can detect that output timing has come. In Step S23, when the output timing has been detected, the selection part 302 immediately turns on a flag (hereinafter referred to as a "timing flag") which shows that output timing has come. About the adjustment contents information 320 which need not control the timing to output, the selection part 302 immediately turns on the timing flag similarly. On the other hand, when the selection part 302 detects that the output timing comes after predetermined time, for example, the selection part 302 sets the predetermined time to a timer (not shown). The selection part 302 controls such timer so that the timing flag changes to ON after predetermined time passes. However, the processing of the Step S23 is not limited to the example shown here.

Next, the analysis part 301 generates the execution information 315 by analysis of the input information 314 (Step S24), and makes the storage device 31 store the generated execution information 315. However, since analysis by the analysis part 301 has been already described above, therefore description omits.

When Step S24 has been performed and the execution information 315 has been generated, the inference part 300 executes the inference processing to the execution information 315 by the artificial intelligence algorithm (Step S25). In Step S25, the inference part 300 selects, by inferring, the specific adjustment candidate identification information 317 as the adjustment identification information 319 from plural adjustment candidate identification information 317.

In addition, when the judgement of Step S21 is "No", the memory system 3 skips the processing of Steps S22 to S25.

When the judgement result of Step S21 is "No" or Step S25 has been performed, the memory system 3 judges whether the output timing of the adjustment contents information 320 has come (Step S26). For example, the judgment in Step S26 may be provided when the selection part 302 judges whether the timing flag is ON.

When the output timing has come (Yes in Step S26), the selection part 302 selects the contents candidate information 318 from the contents database 316 by the adjustment identification information 319 (decided in Step S25). In the contents database 316, the contents candidate information 318 selected is related to the adjustment candidate identification information 317 which corresponds to the adjustment identification information 319 (used as search key). Thus, the selection part 302 generates the adjustment contents information 320 based on the contents candidate information 318 selected (Step S27). At this time, the selection part 302 selects only the information at which the output timing has come, from the selected contents candidate information 318, and makes the adjustment contents information 320 according to it. That is, in the preferred embodiment, the adjustment contents information 320 does not include the information at which the output timing has not yet come.

When Step S27 has been performed and the new adjustment contents information 320 has been generated, the interface unit 38 transmits the adjustment contents information 320 to the host computer 2 (Step S28).

On the other hand, when the judgement result of Step S26 is "No", the memory system 3 skips the processing of Steps S27 and S28.

In addition, when the judgement result of Step S26 is "No" or Step S28 has been performed, the memory system 3 ends the application execution processing (FIG. 4: Step S4), and returns to the processing which is shown in FIG. 4.

As described above, in the preferred embodiment, the memory system 3 which is connected to the host computer 2 generating the input information 314 (the collection information 211). The memory system 3 includes: the storage device 31 configured to store the application program 311 executing by the host computer 2, to store the contents database 316 relating various contents candidate information 318 used by the host computer 2 with either of plural adjustment candidate identification information 317, and to store the input information 314 which is inputted from the host computer 2; circuitry (the inference part 300, the analysis part 301, the selection part 302, etc.), and the interface unit 38 configured to output the adjustment contents information 320 to the host computer 2. The circuitry configured to: infer, by executing inference by an artificial intelligence algorithm, specific adjustment candidate identification information 317 as the adjustment identification information 319 from the plurality of adjustment candidate identification information 317 according to the input information 314; and select specific contents candidate information 318 as the adjustment contents information 320 from the contents database 316 using the adjustment identification information 319. The memory system 3 outputs only the adjustment contents information 320 (a part of the contents database 316) which is chosen from the plurality of contents candidate information 318. In other words, the memory system 3 does not outputs all the contents candidate information 318. Thus, the possibility that all the contents candidate information 318 (the contents database 316) are stolen is reduced.

Moreover, the controller 30 includes the analysis part 301 which generates the execution information 315 by analyzing the input information 314 from the host computer 2. In addition, the analysis part 301 makes the storage device 31 store the execution information 315. The inference part 300 infers the adjustment identification information 319 according to the input information 314 by inferring adjustment identification information 319 using the execution information 315. Thereby, compared with a case where the inference part 300 infers directly from the input information 314, the inferring processing is mitigable.

Moreover, the application program 311 includes the request information 312 to specify the input information 314 by the host computer 2. The input information 314 collected according to the request information 312. Therefore, the memory system 3 may narrow the input information 314 down to the information which is necessary for each application program. Thus, to the host computer 2, the memory system 3 can request only specified information. Thereby, since only required information is inputted as the input information 314 for each application, it may decrease that the unnecessary information is inputted into the memory system 3.

Moreover, the controller 30 further includes the selection part 302 which determines the output timing in which the interface unit 38 outputs the adjustment contents information 320 to the host computer 2. The interface unit 38 outputs the adjustment contents information 320 which has been selected by the selection part 302 to the host computer 2 according to the output timing which has been determined by the selection part 302. Thereby, it not only can adjust in real time, but it can adjust to arbitrary timing. For example, it may adjust at the time of start after the next time.

In the preferred embodiment, the selection part 302 explained the example which has the function determining the output timing of the adjustment contents information 320. However, the interface unit 38 may have the function determining the output timing. For example, the interface unit 38 may monitor the information shown in the input information 314, and may determine the output timing of the adjustment contents information 320. The interface part 38 can monitor the information shown in the input information 314, when the interface unit 38 received the input information 314 (the collection information 211) from the host computer 2.

In the preferred embodiment described that analyzing of the input information 314 (the collection information 211) and generating of the execution information 315 is provided by the memory system 3. However, it is not limited to such composition. For example, the information equivalent to the execution information 315 may be generated by the host computer 2.

Figure 7:
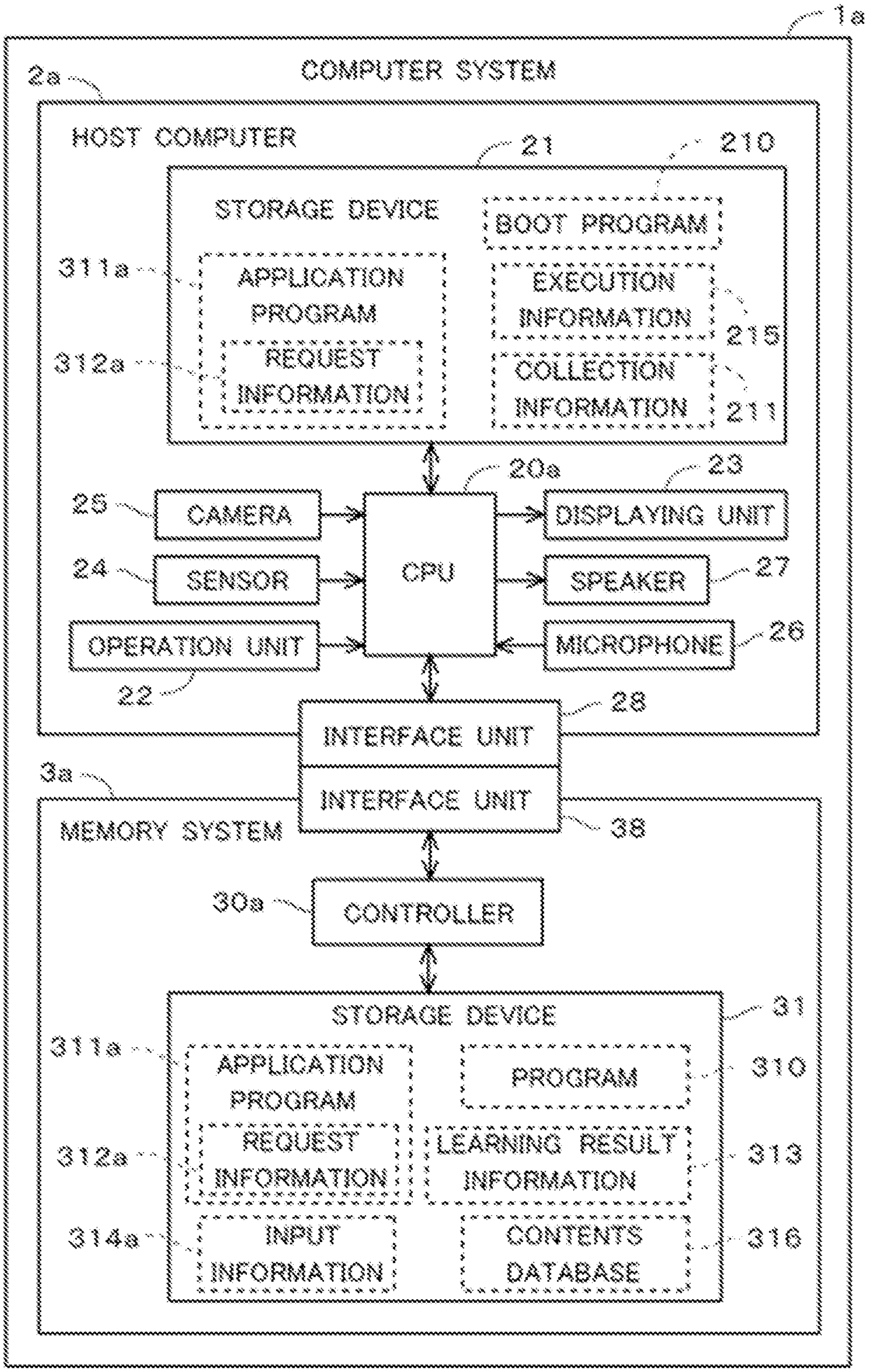
FIG. 7 is a block diagram of a computer system in another preferred embodiment.

FIG. 7 is a block diagram of a computer system 1*a* in another preferred embodiment. The computer system 1*a* is different from the computer system 1 in that the computer system 1*a* comprises a host computer 2*a* and a memory system 3*a*, in place of the host computer 2 and the memory system 3.

In the following description, mainly, a different point from the computer system 1 is described about the computer system 1*a*. On the other hand, for the computer system 1*a*, the same components as those in the computer system 1 are labeled with the same reference numerals and the description thereof is suitably omitted.

The host computer 2*a* is different from the host computer 2 in that the host computer 2*a* includes a CPU 20*a* in place of the CPU 20. Moreover, the storage device 21 of the host computer 2*a* is different from the storage device 21 of the host computer 2 in that it stores request information 312*a* in place of the request information 312. Furthermore, the storage device 21 of the host computer 2*a* stores execution information 215.

The request information 312*a* stored in the storage device 21 is a request information 312*a* stored by the storage device 31 of the memory system 3*a*. Like the request information 312, the request information 312*a* includes the information which indicates what information is needed to generate the collection information 211. However, the request information 312*a* also includes the information which shows what the execution information 215 is generated according to the collection information 211. In this point, the request information 312*a* differs from the request information 312.

The execution information 215 is information generated by the host computer 2*a*, and is information equivalent to the execution information 315 in the preferred embodiment. The execution information 215 is transmitted towards the memory system 3*a*, and is stored by the storage device 31 as the input information 314*a*.

Figure 8:
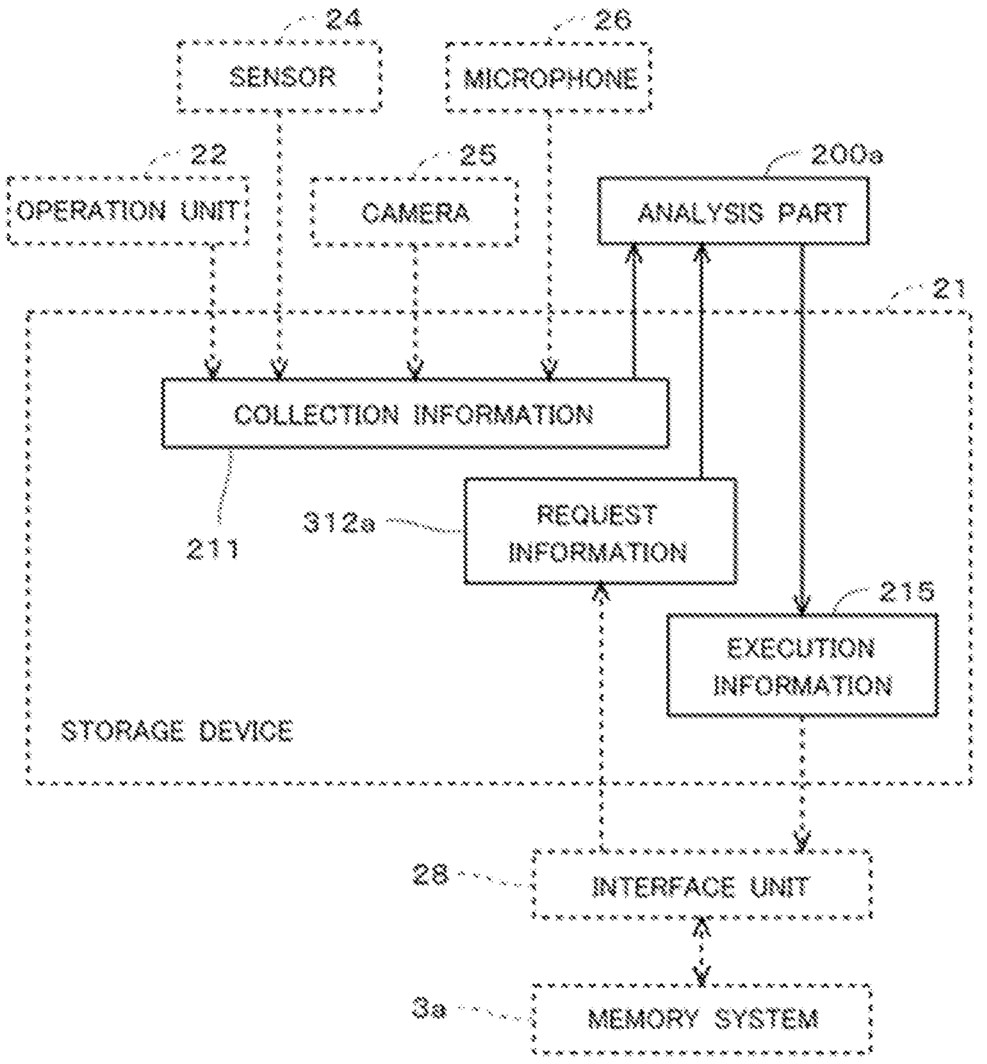
FIG. 8 shows functional block included in a host computer in the other preferred embodiment, with a data flow.

FIG. 8 shows functional block included in the host computer 2*a* in the other preferred embodiment, with a data flow. An analysis part 200*a* shown in FIG. 8 is the functional block achieved by the CPU 20*a* in accordance with a application program 311*a*.

In the preferred embodiment, the analysis part 301 conducts analysis of the collection information 211 (the input information 314), and generates the execution information 315 as the analysis result. On the other hand, the analysis part 200*a* conducts analysis of the collection information 211, and has a function which generates the execution information 215 as an analysis result. That is, the analysis part 200*a* has the same function as the analysis part 301. In other words, in the computer system 1*a* in the other preferred embodiment, Step S24 shown in FIG. 6 is performed by the host computer 2*a*.

The execution information 215 generated by the analysis part 200*a* is transmitted towards the memory system 3*a* through the interface unit 28. In other words, in the computer system 1*a* in the other preferred embodiment, processing which transmits the execution information 215 is performed instead of Step S15 shown in FIG. 5.

Returning to FIG. 7, the memory system 3*a* is different from the memory system 3 in that the memory system 3*a* includes a controller 30*a* in place of the controller 30. The storage device 31 of the memory system 3*a* is different from the storage device 31 of the memory system 3 in that it stores the application program 311*a* (includes the request information 312*a*) and the input information 314*a* in place of the application program 311 and the input information 314. In addition, the storage device 31 of the memory system 3*a* does not store the execution information 315.

Figure 9:
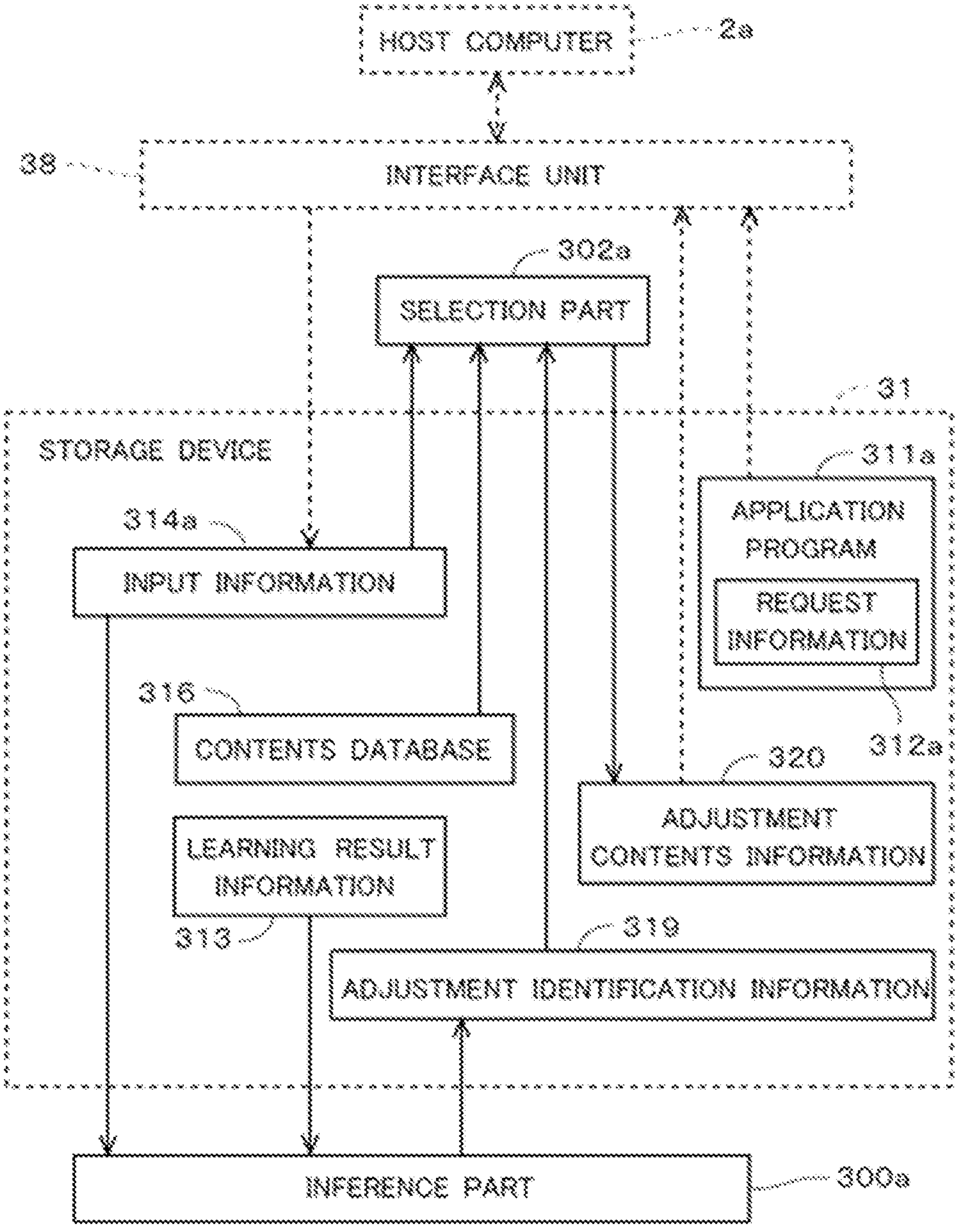
FIG. 9 shows functional blocks included in a configured controller in the other preferred embodiment, with a data flow.

FIG. 9 shows functional blocks included in the controller 30*a* in the other preferred embodiment, with a data flow. An inference part 300*a* and a selection part 302*a* shown in FIG. 9 are the functional blocks achieved by the controller 30*a*.

The controller 30*a* is different from the controller 30 in that it includes the inference part 300*a* and the selection part 302*a* in place of the inference part 300 and the selection part 302. In addition, the controller 30*a* is different from the controller 30 in that it does not includes the analysis part 301.

The inference part 300*a* performs the inference processing based on the input information 314*a*, and generates the adjustment identification information 319 as a inferred result.

As described above, the host computer 2*a* transmits to the memory system 3*a* the execution information 215 which is generated by analyzing the collection information 211 in place of the collection information 211. Thereby, the memory system 3*a* stores not the collection information 211 but the execution information 215 as the input information 314*a*. Moreover, the execution information 215 is information equivalent to the execution information 315. Therefore, the input information 314*a* which is inputted into the inference part 300*a* is information equivalent to the execution information 315. That is, the inference part 300*a* can generate the adjustment identification information 319 as the inference result by performing an inference processing equivalent to the inference processing which the inference part 300 performs.

The selection part 302*a* is different from the selection part 302 in that it determines output timing according to the input information 314*a* (the execution information 215 which analyzes the collection information 211 and is generated) instead of the input information 314 (the collection information 211).

In the computer system 1*a* constituted as described above, it is not necessary to transmit the contents database 316 to the host computer 2*a*. Therefore, the security level of the memory system 3*a* improves like the computer system 1.

Moreover, in the computer system 1*a*, the host computer 2*a* conducts analysis of the collection information 211. Thereby, the memory system 3*a* does not need to be equipped with the functional block equivalent to the analysis part 301. Therefore, compared with the CPU 20*a* of the host computer 2*a*, the burden of the low controller 30*a* (it is included in the memory system 3*a*) of operation capability is decreased.

In some preferred embodiments described above, only the memory systems 3 and 3*a* are structures which perform the inference processing, for example. However, it is not limited to such composition.

Figure 10:
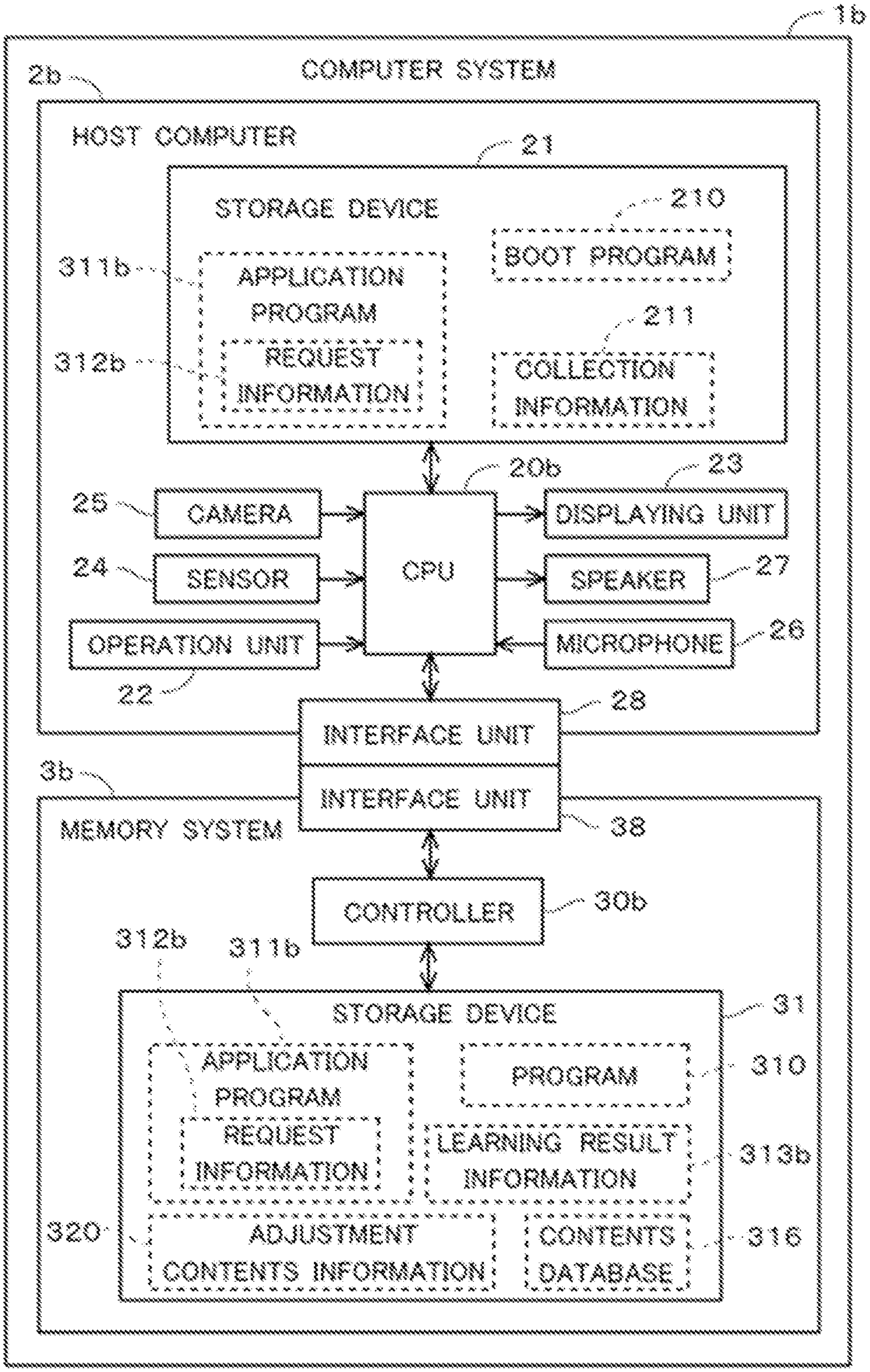
FIG. 10 is a block diagram of a computer system in a still another preferred embodiment.

FIG. 10 is a block diagram of a computer system 1*b* in a still another preferred embodiment. The computer system 1*b* is different from the computer system 1 in that the computer system 1*b* includes a host computer 2*b* and a memory system 3*b*, in place of the host computer 2 and the memory system 3.

In the following description, mainly, a different point from the computer system 1 is described about the computer system 1*b*. On the other hand, for the computer system 1*b*, the same components as those in the computer system 1 are labeled with the same reference numerals and the description thereof is suitably omitted.

The host computer 2*b* is different from the host computer 2 in that it includes a CPU 20*b* in place of the CPU 20. Moreover, the storage device 21 of the host computer 2*b* is different from the storage device 21 of the host computer 2 in that it stores application program 311*b* (includes the request information 312*b*) in place of the application program 311 (includes the request information 312).

Although the request information 312*b* is included in the application program 311*b* in place of the application program 311, it is equivalent to the request information 312.

In FIG. 10, the learning result information 313*b* has been illustrated as if it is stored in the storage device 31. However, in the still other preferred embodiment, the controller 30*b* which is FPGA is constituted in the state in which the controller 30b has reflected the learning result information 313b. Although the learning result information 313b is similar to the learning result information 313, it is not same.

Figure 11:
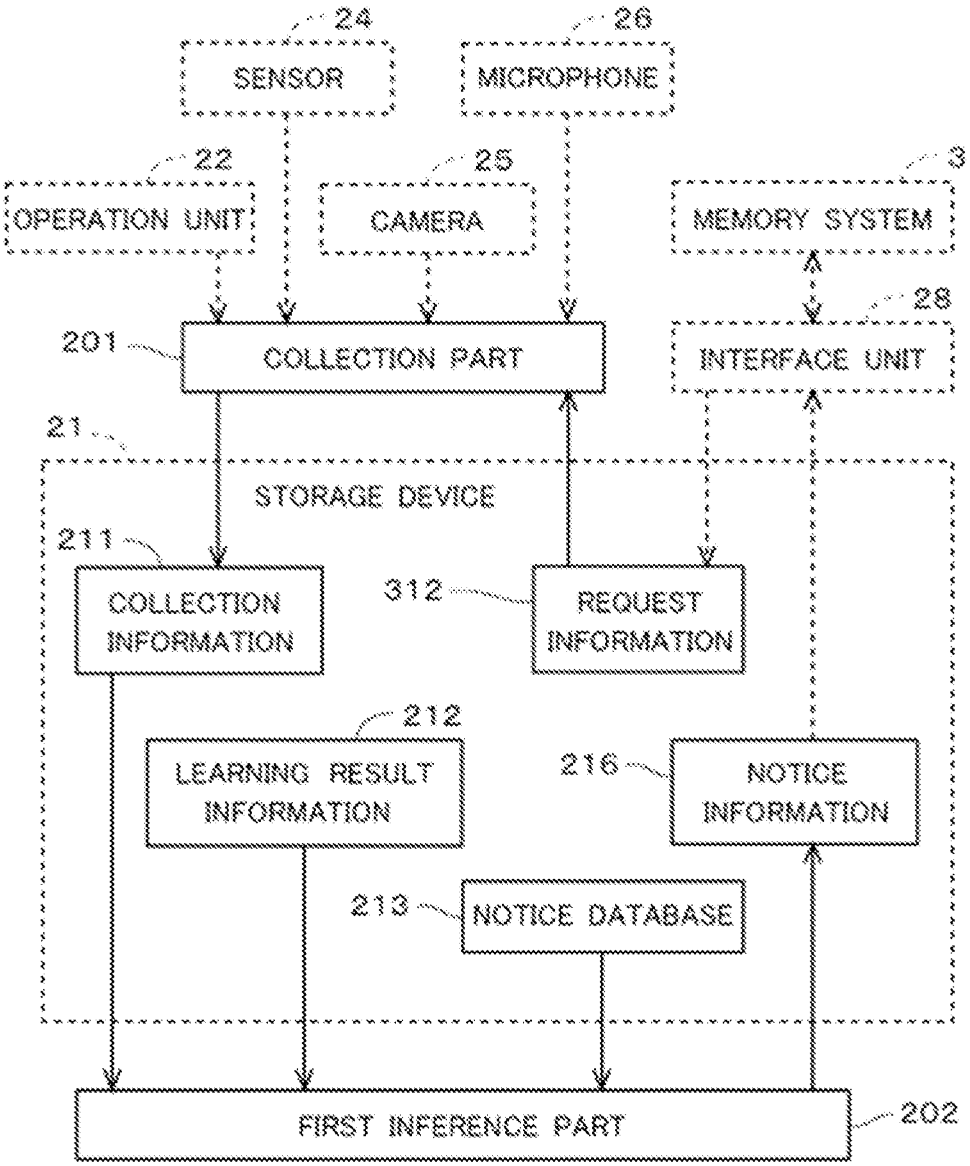
FIG. 11 shows functional blocks included in a host computer in the still other preferred embodiment, with a data flow.

FIG. 11 shows functional blocks included in the host computer 2b in the still other preferred embodiment, with a data flow. A collection part 201 and first inference part 202 that are shown in FIG. 11 are the functional blocks achieved by the operation of the CPU 20b in accordance with the boot program 210 or the application program 311b.

The learning result information 212 is information used at the time of inference processing (describe later) executing by an artificial intelligence realized by the first inference part 202. As similar to the learning result information 313, the learning result information 212 consists of arithmetic coefficients, threshold values, etc. which are used for the inference processing, for example. But the learning result information 212 is not same as the learning result information 313. Especially the learning result information 313 in the preferred embodiment is information for constituting the controller 30 which is FPGA, as already explained. On the other hand, the learning result information 212 is information used by the CPU 20b (not FPGA).

In the following description, the learning result information 212 is explained as fixed information. However, the learning result information 212 may be updated by the learning processing after shipment. Or the learning result information 212 may be uploaded to a server. In this case, after optimizing the learning result information 212 by the server side, it may be downloaded.

The notice database 213 is a database which associated various information mutually.

FIG. 12 shows an example of the notice database 213 in the still other preferred embodiment. The notice database 213 has an area which stores phenomenon information, and an area which stores notice candidate information 214.

The phenomenon information is information expressing each phenomenon defined in the application program 311b. In the example shown in FIG. 12, "age", "sex", the "level", and the "state of mind" is defined as phenomenon information about the user. Moreover, the "working condition" is defined as phenomenon information about the computer system 1b. That is, a plurality of "phenomena" are defined by the notice database 213. However, the phenomena shown in FIG. 12 are examples, and they are not limited to those.

As shown in FIG. 12, for the one phenomenon information of the notice database 213, a plurality of the notice candidate information 214 are related. Plural notice candidate information 214 which are related to same phenomenon information may arise as a situation which the same phenomenon information is expressing.

As already explained, a plurality of "partial situations" are assumed by one phenomenon. Therefore, a plurality of "partial situations" are assumed by each phenomenon information defined as the notice database 213. For example, two partial situations ("male" and "female") are assumed by one phenomenon information ("sex"). And each of "partial situations" are defined as the notice candidate information 214.

In addition, like the "age" shown in FIG. 12, the notice candidate information 214 may not be beforehand given to alternatively. The notice candidate information 214 may include information acquired numerically, for example. Moreover, there may be no necessity of adjustment to the game according to a difference of one year old in the user's age. It is possible that the "partial situations" are classified result of the user's age (like less than 10's, early 10's, late 10's, 20's, 30's, 40's, etc.).

The "partial situation" is the information assumed and defined by the designer. Each of partial situations which are defined and stored in the notice database 213 are not all necessarily realized. For example, another side may not be realized if one side is realized like the male and female in sex as for the partial situation realized alternatively. Therefore, the partial situation (partial situation contained in the notice database 213) of only the defined state is only the "candidate" of the partial situation which may arise in the computer system 1b until it is judged with having realized at least. Moreover, the "partial situation" becomes as "notified" information to the memory system 3b from the host computer 2b although the details will be described later. Therefore, the "partial situation" which is defined by the designer is stored as the notice "candidate" information 214 in the notice database 213.

The notice database 213 may be stored in the boot program 210 as an initial state. The items (the phenomenon information about the user, the notice candidate information 214 related with it, etc.) which should be defined in common in the many application programs 311b are already defined, and are prepared for the notice database 213 of the initial state. The peculiar phenomenon information and the notice candidate information 214 for each of the application programs 311b are added by each of the application programs 311b to the notice database 213. However, the application program 311b can be constituted as including all the information which is stored in the notice database 213. In this case, at the time in which the application program 311b is loaded to the host computer 2b, the notice database 213 may be stored by the storage device 21.

The notice information 216 is generated by the first inference part 202, and is outputted towards the memory system 3b through the interface part 28. That is, for the memory system 3b, the notice information 216 is information inputted (like the input information 314). In addition, the details of the notice information 216 are mentioned later.

The collection part 201 shown in FIG. 11 collects the collection information 211 expressing an actual situation based on the input signal from the operation unit 22, the sensor 24, the camera 25, and the microphone 26. In addition, the collection part 201 makes the storage device 31 store the collection information 211. The collection part 201 refers to the request information 312b when generating the collection information 211.

The first inference part 202 executes inference by an artificial intelligence algorithm using the learning result information 212. The first inference part 202, by inferring according to the collection information 211, selects the specific notice candidate information 214 as the notice information 216 from a plurality of the notice candidate information 214. Explaining in more detail, the first inference part 202 executes inference based on the information included in the collection information 211 according to referring to the notice database 213. The first inference part 202 executes this inference to each of phenomenon information which are defined in the notice database 213. Accordingly, the first inference part 202 infers (decides) one "partial situation" which has arisen actually from the plurality of the "partial situations" which are prepared for common phenomenon information.

FIG. 13 shows an example of the notice information 216 in the still other preferred embodiment. The notice information 216 is information in which the "partial situation" as the inference result is stored for each of defined phenomenon information.

In the example shown in FIG. 13, about the user's "age" which is the first phenomenon, the first inference part 202 infers actual age, and makes the notice information 216 store the numerical value which identifies actual inferred age. Such user's age can be inferred based on the image information (it is the image information which picturized the user and contained in the collection information 211) inputted from the camera 25, for example. Or the first inference part 202 may infer based on the input (the information inputted by key operation of the user and contained in the collection information 211) which is inputted from the operation unit 22. Or the first inference part 202 may calculate based on the user's birth date and calendar information which are inputted.

Moreover, depending on the defined phenomenon, there is the "partial situation" which does not change in the long term (or permanent). For example, the "partial situation" which indicates male or female about "sex" does not change eternally about an individual person. About such a phenomenon, once the first inference part 202 infers, the notice candidate information 214 in the notice database 213 may be rewritten to the information which is prohibited to rewrite. In that case, some or all of the notice database 213 is stored in the non-transitory storage area of the storage device 21.

Moreover, referring to the collection information 211, the first inference part 202 infers the state where the user is using the computer systems 1*b* according to the information about a motion. In addition, the information about a motion is collectable by the sensors 24 (an accelerometer, a gyroscope sensor, etc.), for example. In the example to show in FIG. 12, as "busy condition" about the phenomenon, "stillness", "walking", and "on vehicle" are assumed as the notice candidate information 214. In the example to show in FIG. 13, it has been inferred that the "busy condition" is the "stillness".

Moreover, referring to the collection information 211, the first inference part 202 infers the level as the player of the user, according to the user's operation (information which is inputted from the operation unit 22). In the example to show in FIG. 12, as the "level" in the phenomenon, "low", "middle", and "high" are assumed as the notice candidate information 214. In the example to show in FIG. 13, it has been inferred that the "level" is the "high".

In the example above, like the level of the player, the first inference part 202 generates and stores recorded information (history information) about the phenomenon which cannot be inferred if information is not collected for some period. Then, at the time at which the information for necessary period has been collected, the first inference part 202 infers according to the recorded information stored. Moreover, for example, the peculiarities ("a right lever operation is inaccurate", "he likes a specific color", etc.) of the user may be common in the different application program 311*b*. About such a common phenomenon, the first inference part 202 can raise the accuracy of inferring by generating and referring to recorded information.

Furthermore, referring to the collection information 211, the first inference part 202 infers the user's "state of mind", according to the image information (it is collectable with the camera 25) which photographed the user, and the sound information (it is collectable with the microphone 26) containing the user's voice. In the example to show in FIG. 12, as "state of mind" in the phenomenon, "usually", "relaxed", "excitement", "crying", and "anger" are assumed as the notice candidate information 214. In the example to show in FIG. 13, it has been inferred that the "state of mind" is the "relaxed".

Thus, according to the collection information 211, the first inference part 202 has a function of inferring the "partial situation" for each phenomenon which is assumed. The "partial situation" that the first inference part 202 selects for each phenomenon information becomes as the notice information 216. The notice information 216 generated in the host computer 2*b* is outputted towards the memory system 3*b*. That is, the notice information 216 is information which notifies the situation (namely, "partial situation") of each phenomenon to the memory system 3*b* from the host computer 2*b*.

In addition, in the example to show in FIG. 13, the notice information 216 has been shown as information which consisted of only partial situations inferred for each phenomenon information. However, the information which is notified to the memory system 3*b* by the notice information 216 is not limited to this. For example, the notice information 216 may include the information to determine the output timing which is described later.

Moreover, the artificial intelligence algorithm for performing inferring about each phenomenon is realizable by adopting the conventional technology suitably. Therefore, the detailed explanation about the artificial intelligence algorithm which the first inference part 202 performs is omitted.

Figure 14:
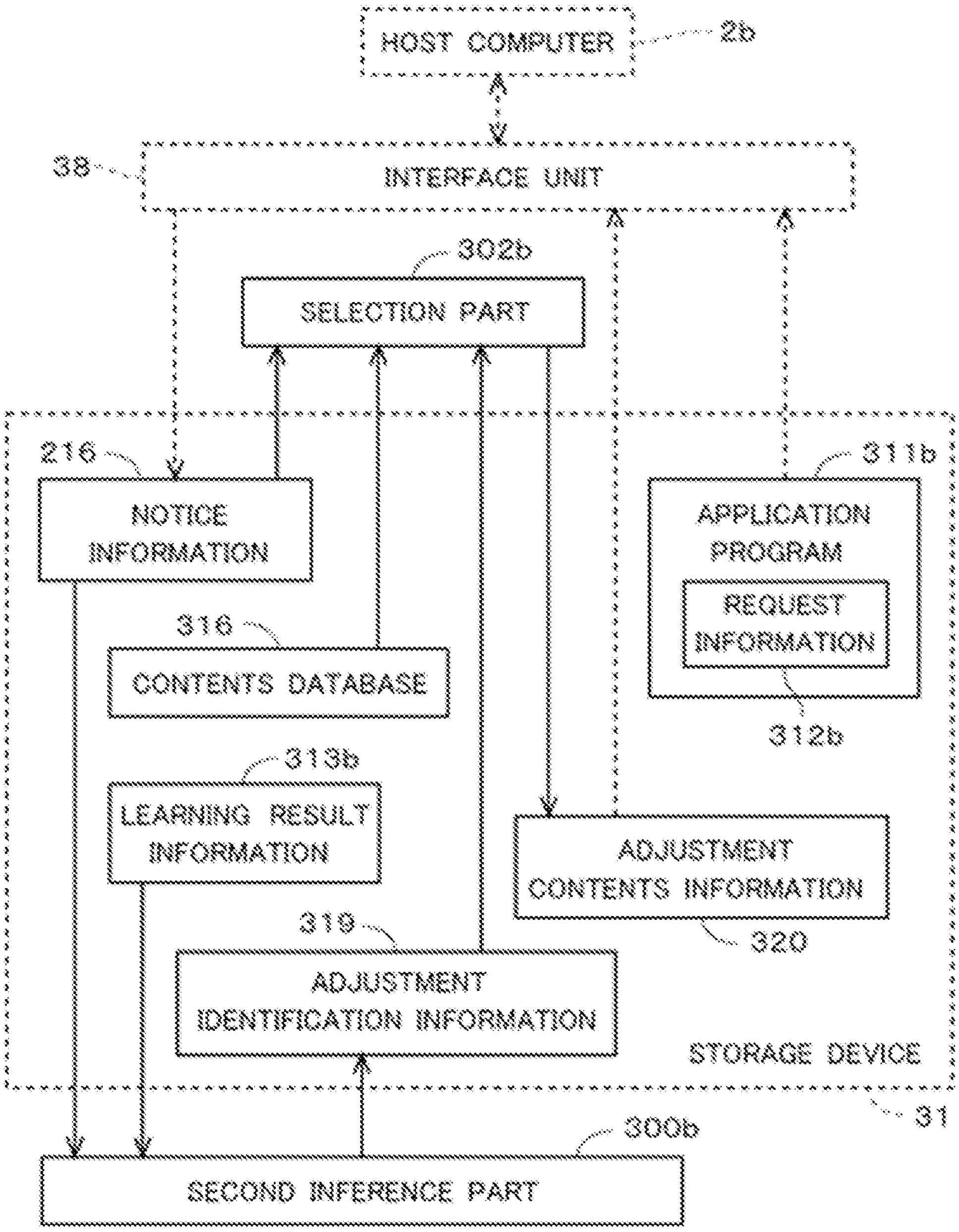
FIG. 14 shows functional blocks included in a configured controller in the still other preferred embodiment, with a data flow.

FIG. 14 shows functional blocks included in the configured controller 30*b* in the still other preferred embodiment, with a data flow. A second inference part 300*b* and a selection part 302*b* which are shown in FIG. 14 is the functional blocks achieved by the controller 30*b*.

The second inference part 300*b* executes inference by an artificial intelligence algorithm using the learning result information 313*b*. The second inference part 300*b*, by inferring according to the notice information 216, selects the specific adjustment candidate identification information 317 as the adjustment identification information 319 from the plural adjustment candidate identification information 317.

In other words, the artificial intelligence algorithm and the learning result information 313*b* are designed so that the optimal adjustment identification information 319 may be inferred, according to the notice information 216 which is inputted into the second inference part 300*b*. And the controller 30*b* is configured according to such design. In addition, the artificial intelligence algorithm for performing such inferring is realizable by adopting the conventional technology suitably. Therefore, the detailed explanation about the artificial intelligence algorithm which the second inference part 300*b* performs is omitted.

As described above, the notice information 216 is generated based on the collection information 211 observed and collected by the host computer 2. Therefore, the notice information 216 is the information expressing the situation when the collection information 211 was collected. That is, the inference by the second inference part 300*b* judges which of assumed situations (assumed by the designer) are real situation currently expressed by the collection information 211, and selects a specific adjustment candidate from the plurality of adjustment candidates which are prepared, as the optimal adjustment.

Thereby, the adjustment (adjustment identified by the adjustment identification information 319) actually provided is determined out of the plurality of adjustment candidates (adjustment candidates identified by the adjustment candidate identification information 317) that the designer prepares. Moreover, the second inference part 300*b* has a function to make the storage device 31 store the adjustment identification information 319.

Like the selection part 302, the selection part 302*b* has a function which selects the contents candidate information 318 which is related to the adjustment candidate identification information 317 (corresponding to the adjustment discernment information 319), from the contents database 316. The selection part 302*b* generates the adjustment contents information 320 based on the contents candidate information 318 which has been selected.

Thus, when the host computer 2*b* uses the adjustment contents information 320 which is selected by the selection part 302*b*, the optimal adjustment (the adjustment prepared) for the actual situation expressed by the notice information 216 is realized. Thereby, like the computer system 1, the computer system 1*b* can adjust the application (the game) into the optimal state according to a situation, without the user's conscious operation (selection operation, for example).

Moreover, the selection part 302*b* in the still other preferred embodiment also has a function to determine the output timing of the adjustment contents information 320 which the interface unit 38 should output to the host computer 2*b*. That is, like the selection part 302, the selection part 302*b* is constituted also as a timing determination unit.

However, the selection part 302*b* in the still other preferred embodiment, by monitoring the notice information 216, determines the output timing based on the information (time, user's selection operation, state of progress, for example) which is identified in the notice information 216.

As described above, the number of item and size of data are still huge in the collection information 211. And the inference processing by an artificial intelligence algorithm needs many amounts of operations. Therefore, when only the memory system 3*b* performs a required inference processing (processing required in order to reason a whole situation from the collection information 211), the burden on the controller 30*b* may increase. In that case, the high hardware of throughput is needed for the memory system 3*b*.

However, the computer system 1*b* equips the host computer 2*b* side with the first inference part 202 and equips the memory system 3*b* side with the second inference part 300*b*. And the computer system 1*b* has the composition that the first inference part 202 and the second inference part 300*b* share the processing which infers a whole situation according to the collection information 211. That is, performing the inference processing by the artificial intelligence algorithm in the memory system 3*b* raises a security level. On the other hand, the host computer 2*b* with comparatively high operation capability is bearing a part of inference processing. Thereby, the security of the information (contents database 316) is securable, reducing the load in the memory system 3*b*.

The above is the description of the structure and functions of the computer system 1*b*. Next, a method for protecting information using the computer system 1*b* is described.

Figure 15:
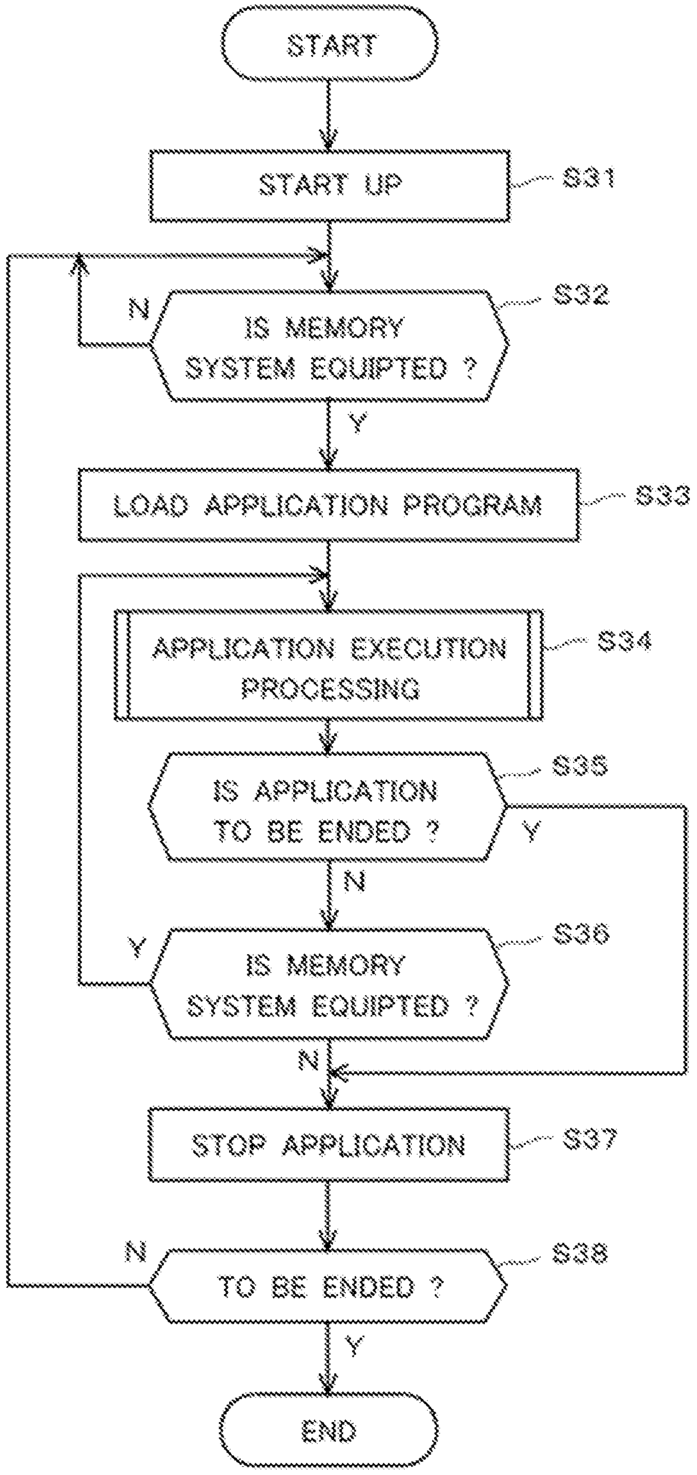
FIG. 15 is a flow chart showing information protection method executing by the computer system in the still other preferred embodiment.

FIG. 15 is a flow chart showing information protection method executing by the computer system 1*b* in the still other preferred embodiment. In addition, before the process shown in FIG. 15 is started, the controller 30*b* shall be already in a condition called "the configured controller 30*b*". Moreover, the boot program 210, the learning result information 212, and the notice database 213 shall be already stored in the storage device 21. Furthermore, the program 310, the application program 311*b*, the learning result information 313*b*, and the contents database 316 shall be already stored in the storage device 31. That is, the process in which the storage devices 21 and 31 store such information shall have already completed.

Processing of Steps S31 to S38 shown in FIG. 15 can be performed like processing of Steps S1 to S8 shown in FIG. 4. Therefore, explanation is omitted.

Next, operation of the host computer 2*b* in the application execution processing shown in Step S34 is explained.

Figure 16:
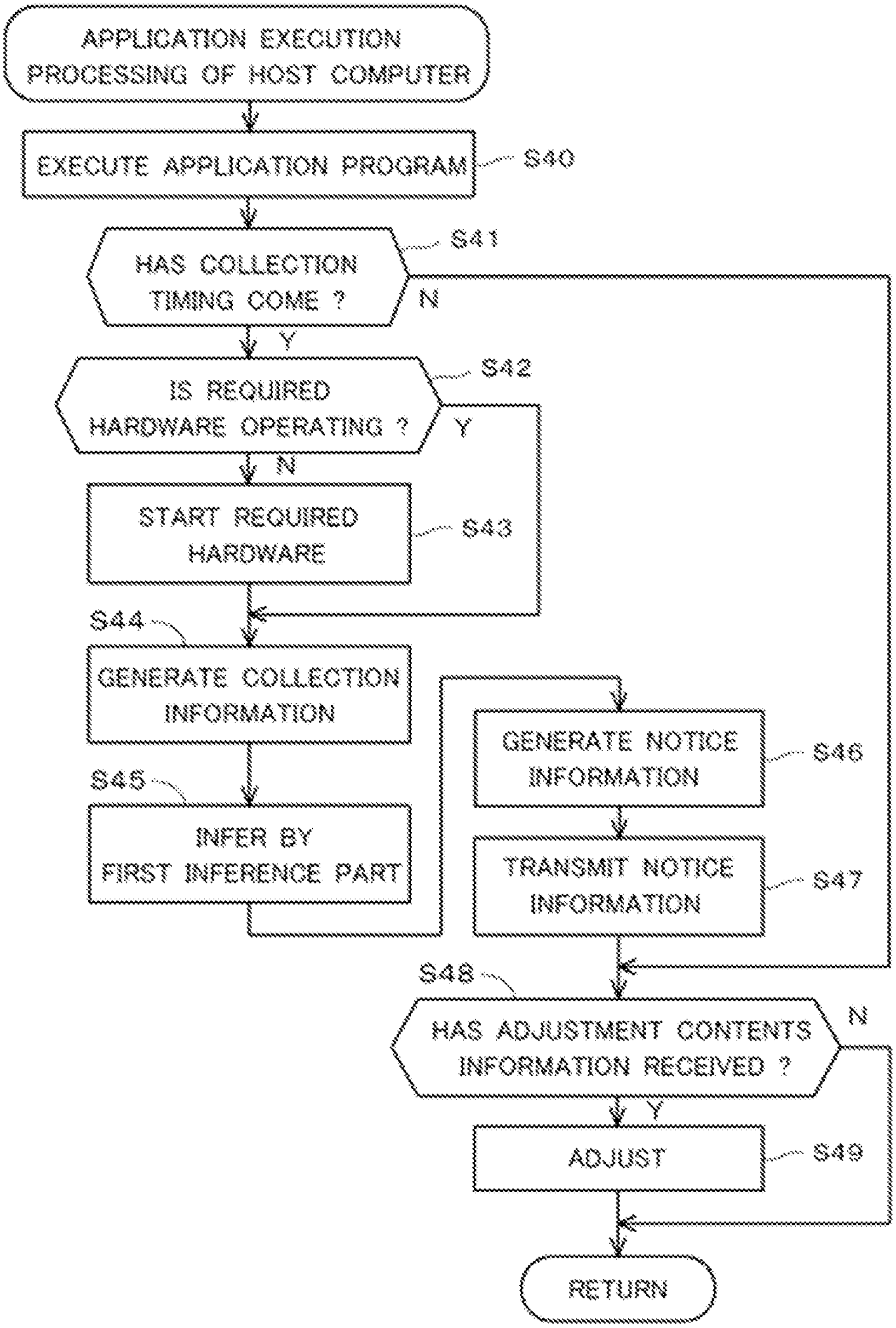
FIG. 16 is a flow chart showing executing process by the host computer in application execution processing in the still other preferred embodiment.

FIG. 16 is a flow chart showing executing process by the host computer 2*b* in the application execution processing in the still other preferred embodiment.

When the application execution processing has been started, the CPU 20*b* executes the application program 311*b* (Step S40). In addition, processing of Steps S40 to S44 shown in FIG. 16 can be performed like processing of Steps S10 to S14 shown in FIG. 5. Therefore, explanation is omitted.

When the new collection information 211 has been generated by performing Step S44, the first inference part 202 in the host computer 2*b* infers according to the new collection information 211 (Step S45).

In Step S45, the first inference part 202 executes the inference to each of phenomenon information which are defined in the notice database 213. The first inference part 202 selects the specific notice candidate information 214 as the notice information 216 from the plurality of the notice candidate information 214 which is prepared for common phenomenon information. The notice candidate information 214 which has been specified by the inference is stored in predetermined area of the notice information 216. Therefore, when the inference is ended about all the defined phenomenon information completely, the notice information 216 is generated (Step S46).

When the notice information 216 has been generated, the interface part 28 outputs the newly generated notice information 216 to the memory system 3*b* (Step S47). The notice information 216 is information which notifies one or more of the "partial situations" to the memory system 3*b*. But as another meaning, the notice information 216 is a read-out command which requires the adjustment contents information 320 to the memory system 3*b*.

When the judgement result of Step S41 is "No" or Step S47 has been performed, the CPU 20*b* judges whether the adjustment contents information 320 has been received (Step S48). In addition, processing of Steps S48 and S49 shown in FIG. 16 can be performed like processing of Steps S16 and S17 shown in FIG. 5. Therefore, explanation is omitted.

When Step S49 has been performed or the judgement result of Step S48 is "No", the host computer 2*b* ends the application execution processing (FIG. 15: Step S34).

The above is the description of the operation of the host computer 2*b* in the application execution processing.

Next, the operation of the memory system 3*b* in the application execution processing shown in Step S34 is explained.

Figure 17:
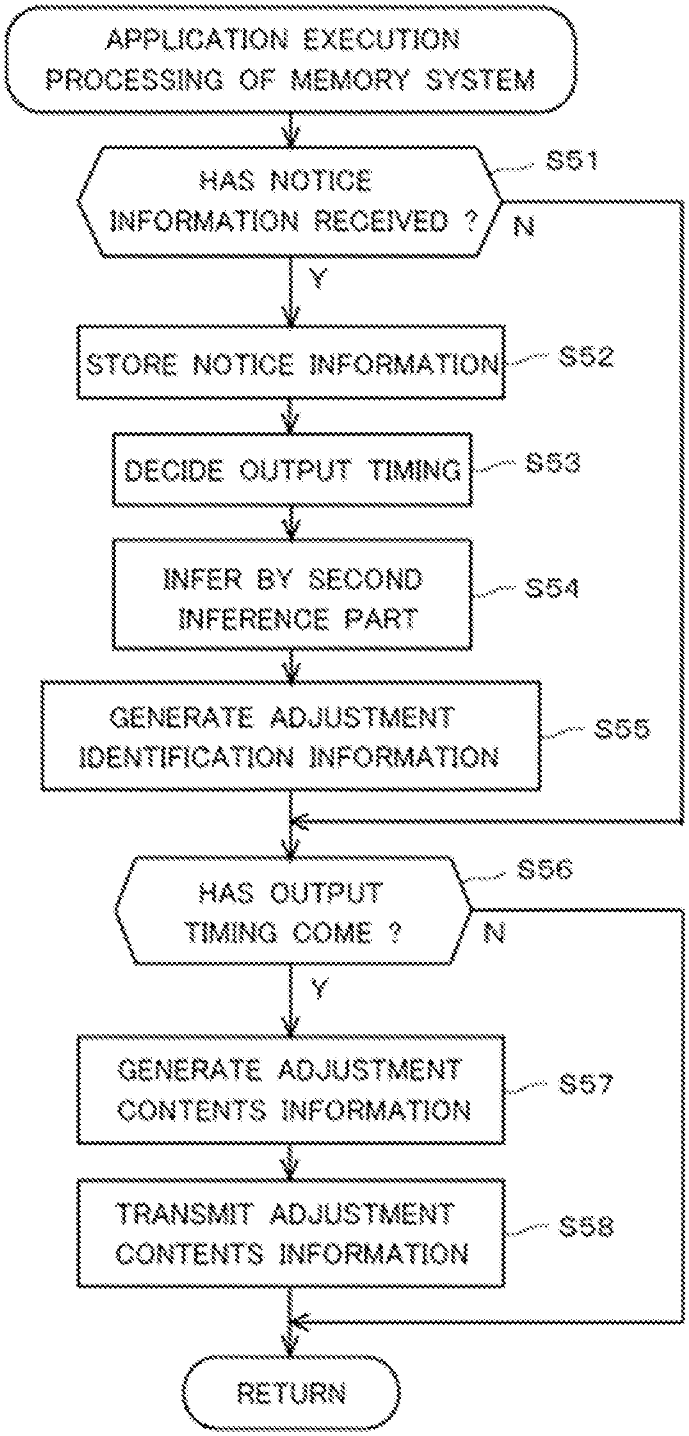
FIG. 17 is a flow chart showing executing process by the memory system in the application execution processing in the still other preferred embodiment.

FIG. 17 is a flow chart showing executing process by the memory system 3*b* in the application execution processing in the still other preferred embodiment. In addition, when the process shown in FIG. 17 has been started, the memory system 3*b* has completed transmission of the application program 311*b* according to the load demand from the host computer 2*b*.

When the application execution processing has been started, the memory system 3*b* judges whether the memory system 3*b* has received the notice information 216 from the host computer 2*b* (Step S51).

When the notice information 216 has been received (Yes in Step S51), the memory system 3*b* makes the storage device 31 store the notice information 216 received (Step S52).

Moreover, the selection part 302*b* determines the output timing of the adjustment contents information 320 according to the notice information 216 (Step S53).

In addition, processing of Steps S53 can be performed like processing of Steps S23 shown in FIG. 6. However, it is not limited to the example shown here.

Next, the second inference part 300*b* executes the inference processing to the notice information 216 by the artificial intelligence algorithm (Step S54). In Step S54, the second inference part 300*b* selects, by inferring, the specific adjustment candidate identification information 317 as the adjustment identification information 319 from a plurality of adjustment candidate identification information 317. Thereby, the adjustment identification information 319 is generated by the second inference part 300*b* (Step S55).

In addition, when the judgement of Step S51 is "No", the memory system 3*b* skips the processing of Steps S52 to S55.

When the judgement result of Step S51 is "No" or Step S55 has been performed, the memory system 3*b* performs the processing of Step S56. In addition, processing of Steps S56 to S58 shown in FIG. 17 can be performed like processing of Steps S26 to S28 shown in FIG. 6. Therefore, explanation is omitted.

In addition, when the judgement of Step S56 is "No" or Step S58 has been performed, the memory system 3*b* ends the application execution processing (FIG. 15: Step S34).

As described above, the computer system 1*b* includes the host computer 2*b* executing the application program 311*b*, and the memory system 3*b* connected to the host computer 2*b*. The host computer 2*b* includes the storage 21 configured to store the plurality of notice candidate information 214; first circuitry (the collection part 201, the first inference part 202, etc.) configured to: collect the collection information 211 expressing the situation; and infer, by executing inference by the artificial intelligence algorithm, the specific notice candidate information 214 as the notice information 216 from the plurality of notice candidate information 214 according to the collection information 211; and the interface unit 28 configured to output the notice information 214 to the memory system 3*b*. The memory system 3*b* includes: the storage 31 configured to store the application program 311*b*, and the contents database 316 relating various contents candidate information 318 used by the host computer 2*b* with either of plural adjustment candidate identification information 317; the interface unit 38 configured to receive the notice information 216 outputted from the interface unit 28; and second circuitry (the second inference part 300*b*, the selection part 302*b*, etc.) configured to: infer, by executing inference by the artificial intelligence algorithm, the specific adjustment candidate identification information 317 as the adjustment identification information 319 from the plurality of adjustment candidate identification information 317 according to the notice information 216 outputted by the interface unit 28; select the specific contents candidate information 318 as the adjustment contents information 320 from the contents database 316 using the adjustment identification information 319. The interface unit 38 outputs the adjustment contents information 320 to the host computer 2*b*. Thereby, the computer system 1*b* can reduce the load of the memory system 3*b*, strengthening the security to the information (especially the contents database 316) stored in the memory system 3*b*.

In addition, in the still other preferred embodiment, the first inference part 202 infers the "partial situation" according to the collection information 211. The second inference part 300*b* infers the "whole situation" according to the partial situation which has been inferred by the first inference part 202. That is, the first inference part 202 and the second inference part 300 share the inferring processing. However, the assignment of the inferring processing by both is not limited to description above. For example, the first inference part 202 outputs the middle information generated in the middle of the calculation which directly infers the "whole situation" using the collection information 211, as the notice information 216 to the memory system 3*b*. Finally, according to executing the remaining calculation by the memory system 3*b* side, the adjustment contents information 320 may be generated. That is, the processing to share does not necessarily need to be shared logically. According to the artificial intelligence algorithm to adopt, the collection information 211, and the throughput of the controller 30*b*, the sharing of role should be determined.

While the invention has been shown and described in detail, the foregoing description is in all aspects illustrative and not restrictive. It is therefore understood that numerous modifications and variations can be devised without departing from the scope of the invention. The scope of the present invention is shown by claims.

For example, the Steps shown in some embodiments are mere examples. The Steps are not limited to the order and the contents described above. That is, if the same effect can be acquired, the order or the contents may be modified as appropriate.

The functional blocks (e.g., the inference part 300, the analysis part 301, and the selection part 302) shown in some embodiments are achieved in forms of software by the operation of the configured controller 30, 30*a*, 30*b*. However, a portion or an entire portion of those functional blocks may be formed by a dedicated logic circuit in the form of hardware.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A memory system connected to a host computer generating input information, the memory system comprising:

a storage configured to:

store an application program executed by the host computer;

store a contents database including contents candidate information, used by the host computer, and a plurality of adjustment candidate identification information in association with each other; and store the input information from the host computer;

circuitry configured to:
infer, by executing an artificial intelligence algorithm, specific adjustment candidate identification information as adjustment identification information from the plurality of adjustment candidate identification information according to the input information; and
select specific contents candidate information as adjustment contents information from the contents database using the adjustment identification information; and
an interface configured to output the adjustment contents information to the host computer.

2. The memory system according to claim 1, wherein the circuitry is further configured to:
generate execution information by analyzing the input information from the host computer;
store the execution information in the storage; and
infer the adjustment identification information according to the input information by inferring adjustment identification information using the execution information.

3. The memory system according to claim 1, wherein
the application program includes request information to specify the input information by the host computer; and
the input information is collected according to the request information.

4. The memory system according to claim 1, wherein
the circuitry is further configured to determine output timing in which the interface outputs the adjustment contents information to the host computer; and
the interface outputs the adjustment contents information selected to the host computer according to the output timing determined.

5. A computer system, comprising:
a host computer generating input information; and
a memory system connected to the host computer, wherein
the memory system includes:
a storage configured to:
store an application program executed by the host computer;
store a contents database including contents candidate information, used by the host computer, and a plurality of adjustment candidate identification information in association with each other; and
store the input information from the host computer;
circuitry configured to:
infer, by executing an artificial intelligence algorithm, specific adjustment candidate identification information as adjustment identification information from the plurality of adjustment candidate identification information according to the input information; and
select specific contents candidate information as adjustment contents information from the contents database using the adjustment identification information; and
an interface configured to output the adjustment contents information to the host computer.

6. The computer system according to claim 5, wherein the host computer includes:
circuitry configured to generate the input information according to analyzing information collected.

7. A computer system, comprising:
a host computer executing an application program; and
a memory system connected to the host computer, wherein
the host computer includes:
a first storage configured to store a plurality of notice candidate information;
first circuitry configured to:
collect collection information expressing a situation; and
infer, by executing an artificial intelligence algorithm, specific notice candidate information as notice information from the plurality of notice candidate information according to the collection information; and
a first interface configured to output the notice information to the memory system,
the memory system includes:
a second storage configured to store the application program, and store a contents database including contents candidate information, used by the host computer, and a plurality of adjustment candidate identification information in association with each other;
a second interface configured to receive the notice information from the first interface; and
second circuitry configured to:
infer, by executing another artificial intelligence algorithm, specific adjustment candidate identification information as adjustment identification information from the plurality of adjustment candidate identification information according to the notice information;
select specific contents candidate information as adjustment contents information from the contents database using the adjustment identification information, and
the second interface outputs the adjustment contents information to the host computer.

8. An information protection method for information stored in a memory system connected to a host computer generating input information, the information protection method comprising:
storing, by a storage of the memory system, application program executed by the host computer;
storing, by the storage, a contents database including contents candidate information, used by the host computer, and a plurality of adjustment candidate identification information in association with each other;
storing, by the storage, the input information from the host computer;
inferring, by circuitry of the memory system executing an artificial intelligence algorithm, specific adjustment candidate identification information as adjustment identification information from the plurality of adjustment candidate identification information according to the input information;
selecting, by the circuitry, specific contents candidate information as adjustment contents information from the contents database using the adjustment identification information; and
outputting, by an interface of the memory system, the adjustment contents information to the host computer.

9. An information protection method for information stored in a memory system connected to a host computer, wherein the host computer including first storage, first circuitry and first interface and the memory system includes a second storage, second circuitry and a second interface, the information protection method comprising:
storing, by the second storage, an application program executed by the host computer;

storing, by the second storage, a contents database including contents candidate information, used by the host computer, and a plurality of adjustment candidate identification information in association with each other;

storing, by the first storage, a notice database including notice candidate information output to the memory system and a plurality of notice candidate identification information in association with each other;

transmitting, by the second interface, the application program to the host computer;

storing, by the first storage, the application program received from the memory system;

collecting, by the first circuitry, collection information expressing a situation;

inferring, by the first circuitry executing an artificial intelligence algorithm, specific notice candidate information as notice information from the plurality of notice candidate information according to the collection information;

transmitting, by the first interface, the notice information to the memory system;

inferring, by the second circuitry executing another artificial intelligence algorithm, specific adjustment candidate identification information as adjustment identification information from the plurality of adjustment candidate identification information according to the notice information;

selecting, by the second circuitry, specific contents candidate information as adjustment contents information from the contents database using the adjustment identification information; and outputting, by the second interface, the adjustment contents information to the host computer.

* * * * *